(12) United States Patent
Xin et al.

(10) Patent No.: US 8,363,052 B2
(45) Date of Patent: Jan. 29, 2013

(54) AUTOMATIC EXPLODE BASED ON OCCLUSION

(75) Inventors: Shi-Qing Xin, Shanghai (CN); Ying-Guo Zhang, Shanghai (CN); Ke Li, Shanghai (CN)

(73) Assignee: Autodesk, Inc., San Rafael, CA (US)

( * ) Notice: Subject to any disclaimer, the term of this patent is extended or adjusted under 35 U.S.C. 154(b) by 767 days.

(21) Appl. No.: 12/555,693

(22) Filed: Sep. 8, 2009

(65) Prior Publication Data

US 2011/0055700 A1   Mar. 3, 2011

(30) Foreign Application Priority Data

Sep. 2, 2009   (WO) ................ PCT/CN2009/073694

(51) Int. Cl.
*G06T 15/00* (2011.01)
(52) U.S. Cl. ........................................ 345/419; 345/676
(58) Field of Classification Search .................. 345/419, 345/676
See application file for complete search history.

(56) References Cited

U.S. PATENT DOCUMENTS

| 5,905,501 | A | * | 5/1999 | Kato ............................ 345/420 |
| 7,414,628 | B1 | | 8/2008 | Andrews | |
| 7,825,940 | B1 | * | 11/2010 | Vieilly et al. ................ 345/619 |

FOREIGN PATENT DOCUMENTS

| JP | 2008-090754 | | 4/2008 |
| JP | 2008112430 | A * | 5/2008 |

OTHER PUBLICATIONS

Li et al., "Automated Generation of Interactive 3D Exploded View Diagrams." ACM Transactions on Graphics 27(3), Aug. 2008. Retrieved from Internet on Jun. 12, 2009. <URL:http://vis.berkeley.edu/papers/exview3D/exview3D-SIG08.pdf>, 7 pages.
Agrawala et al., "Designing Effective Step-By-Step Assembly Instructions." International Conference on Computer Graphics and Interactive Techniques archive ACM SIGGRAPH 2003 Papers. Retrieved from Internet on Jun. 12, 2009. <URL:http://graphics.stanford.edu/papers/assembly_instructions/assembly.pdf>, 10 pages.
Bao, Wei, International Search Report and Written Opinion in PCT/CN2009/073694, 9 pages.
International Preliminary Report on Patentability from International Application No. PCT/CN2009/073694 mailed Mar. 15, 2012, 5 pgs.

* cited by examiner

*Primary Examiner* — Maurice L McDowell, Jr.
(74) *Attorney, Agent, or Firm* — Fish & Richardson P.C.

(57) ABSTRACT

Methods, systems, and apparatus, including computer program products feature providing a rendering of a three-dimensional assembly of components. An explosion sequence for separating first components of the assembly is determined. The explosion sequence comprises stages in which each stage represents a different spatial relationship between two or more of the first components. A first input is received from an interactive control. A first stage in the explosion sequence is selected based on the first input. The rendering of the assembly is updated, responsive to the first input, to show the first stage of the explosion sequence. A second input is received from the interactive control. A different second stage in the explosion sequence is selected based on the second input. The rendering of the assembly is updated, responsive to the second input, to show the second stage of the explosion sequence.

34 Claims, 12 Drawing Sheets

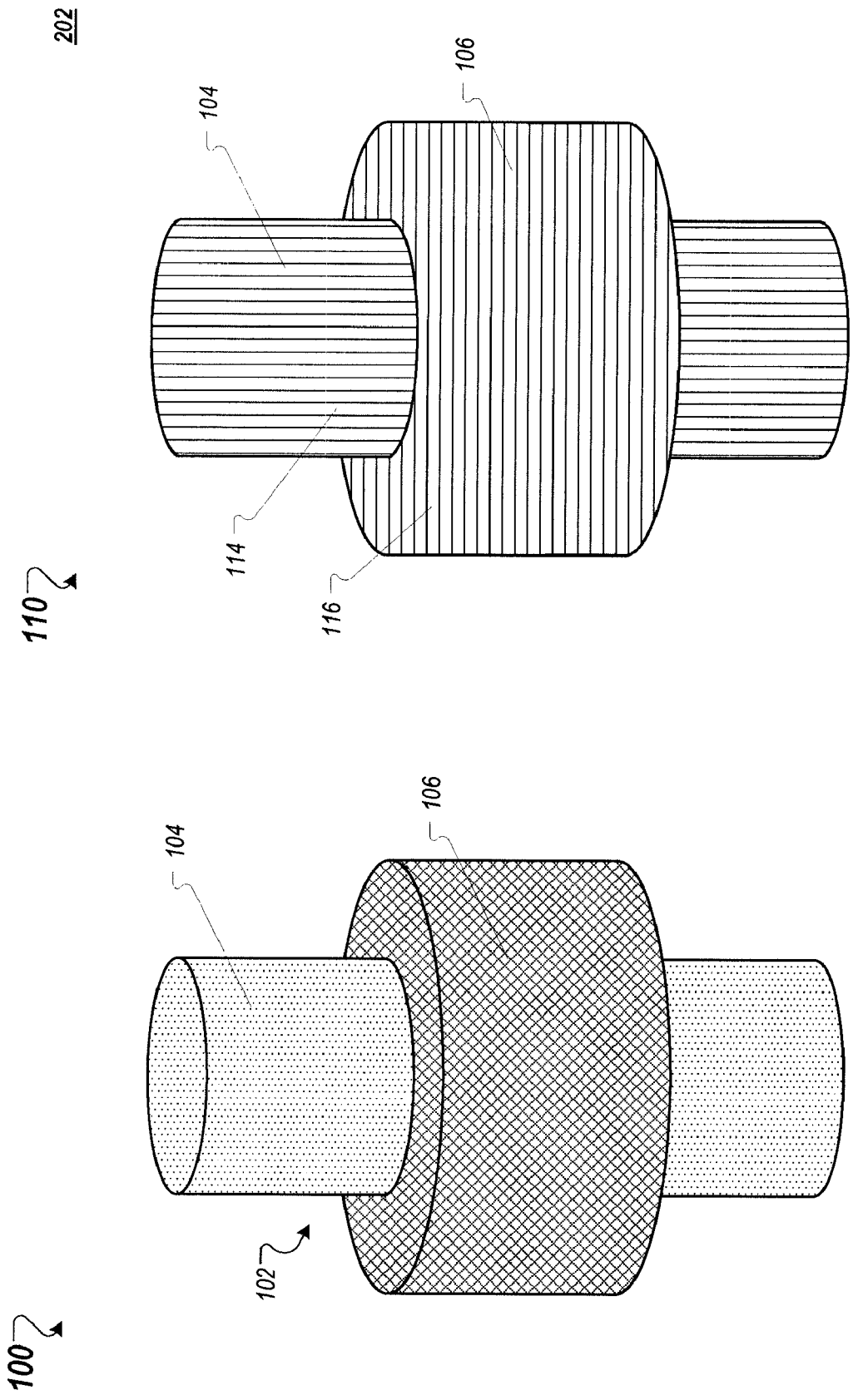

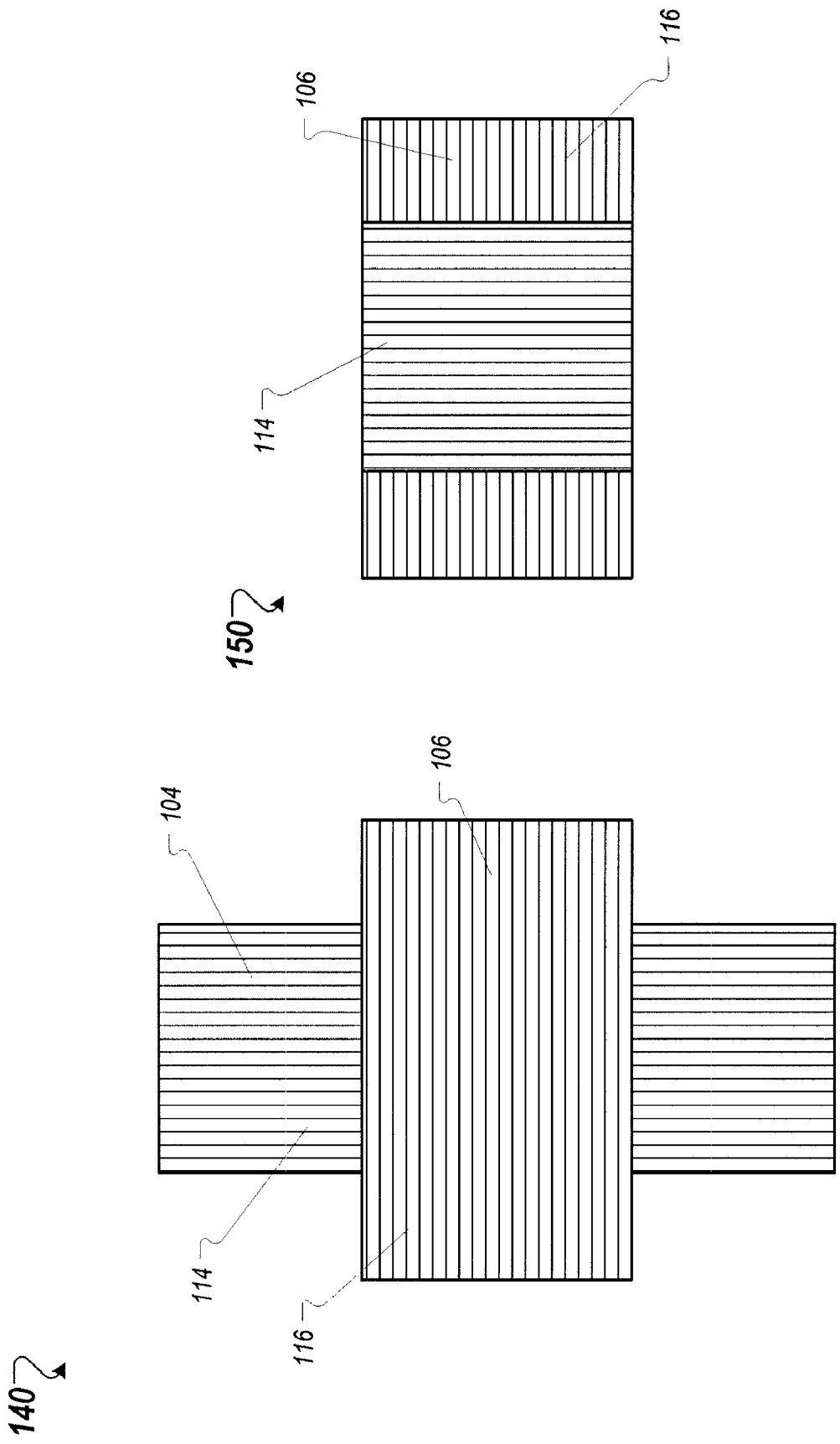

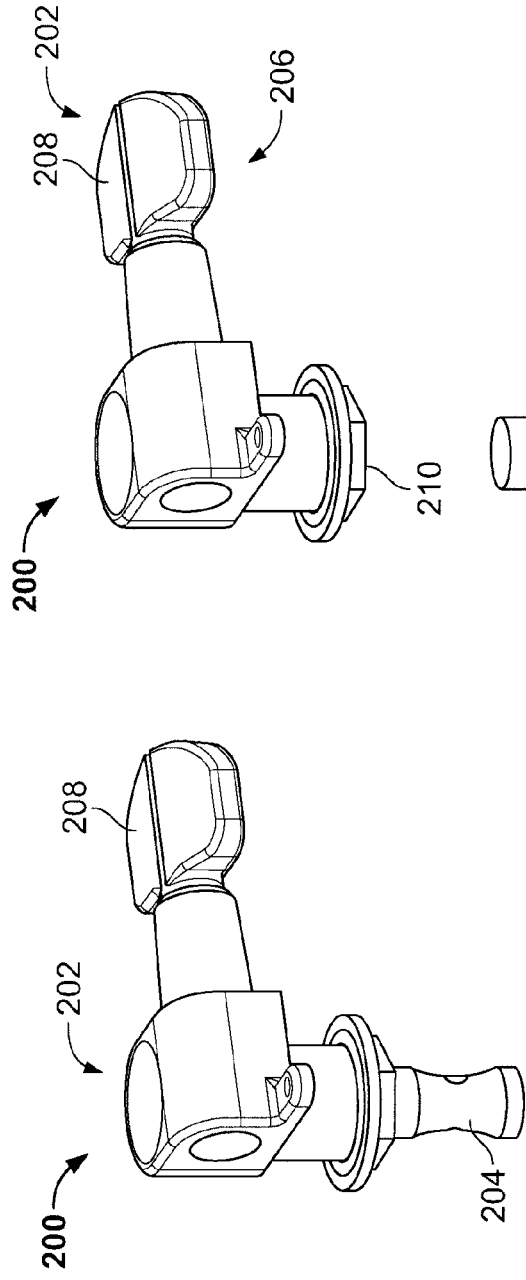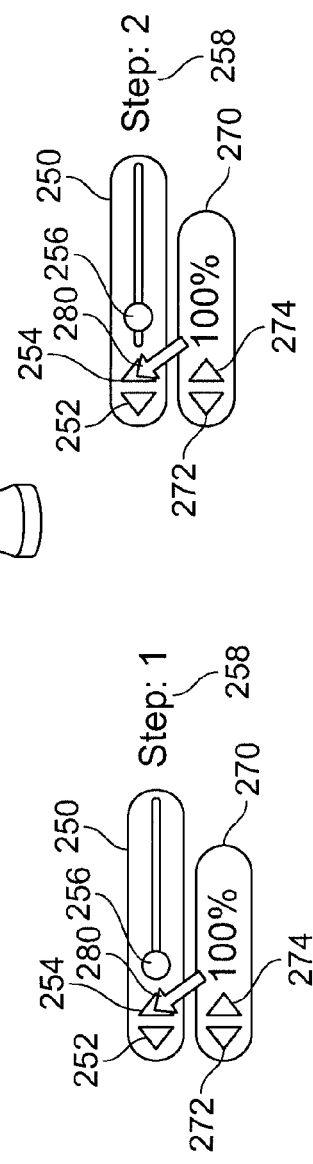

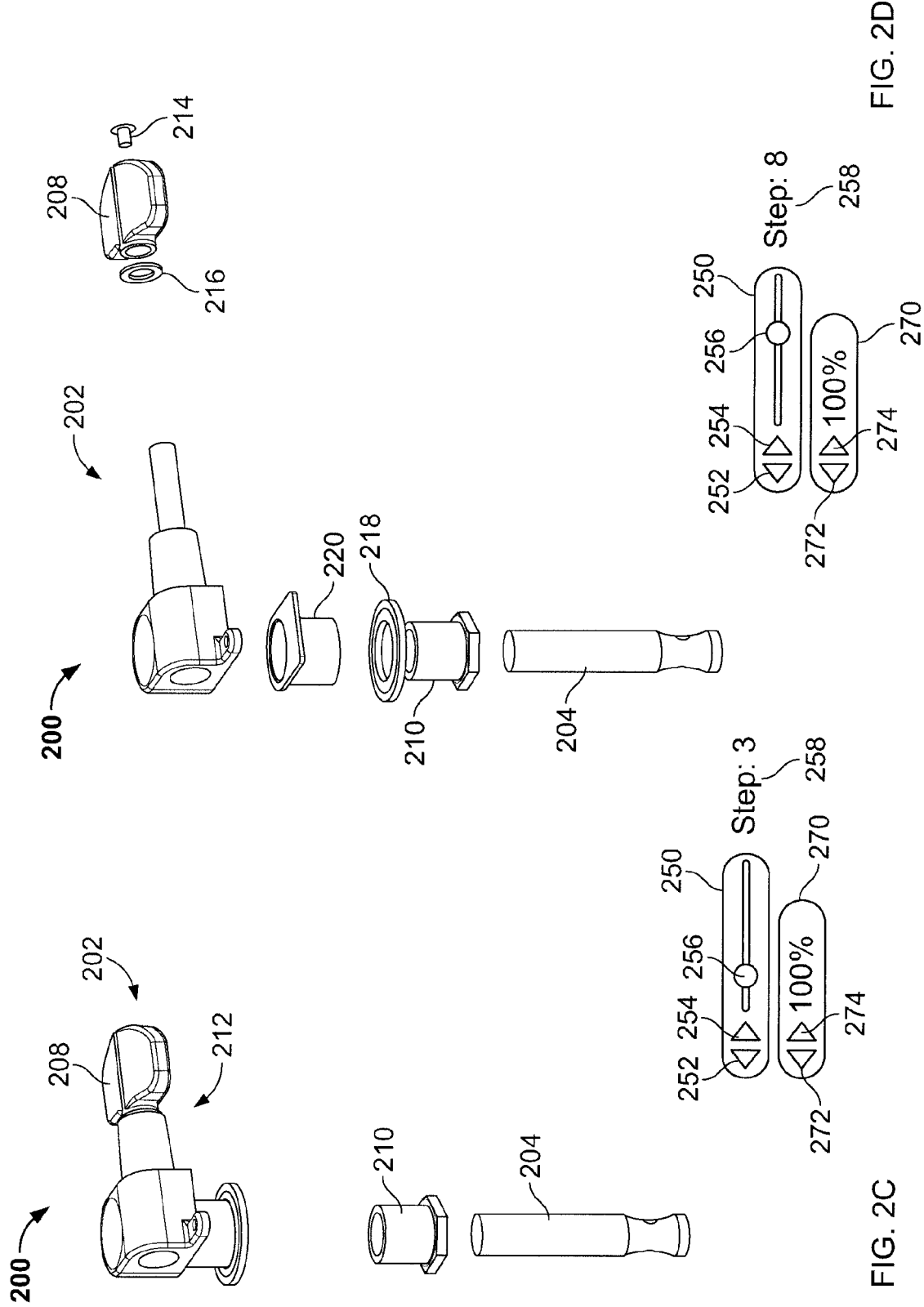

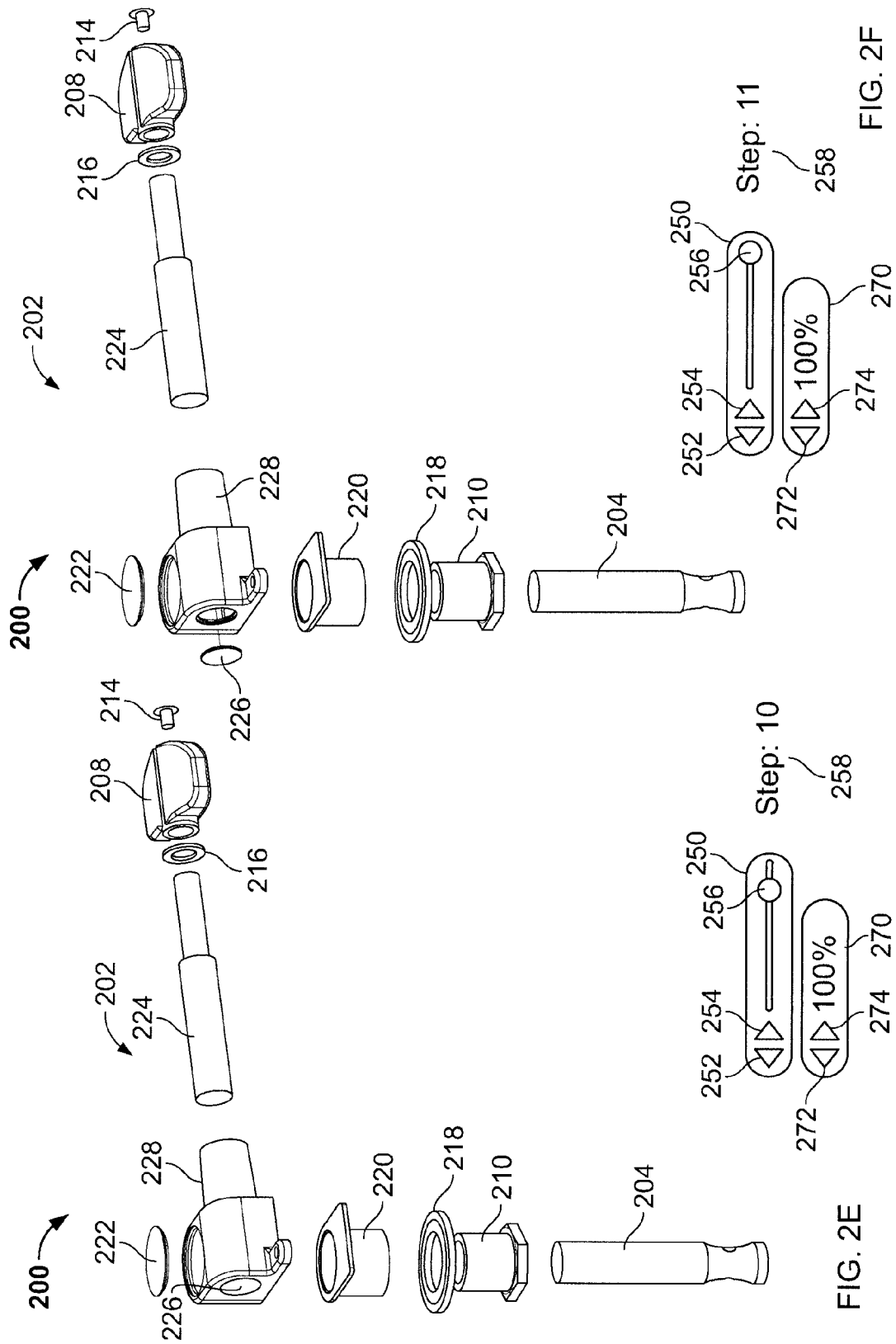

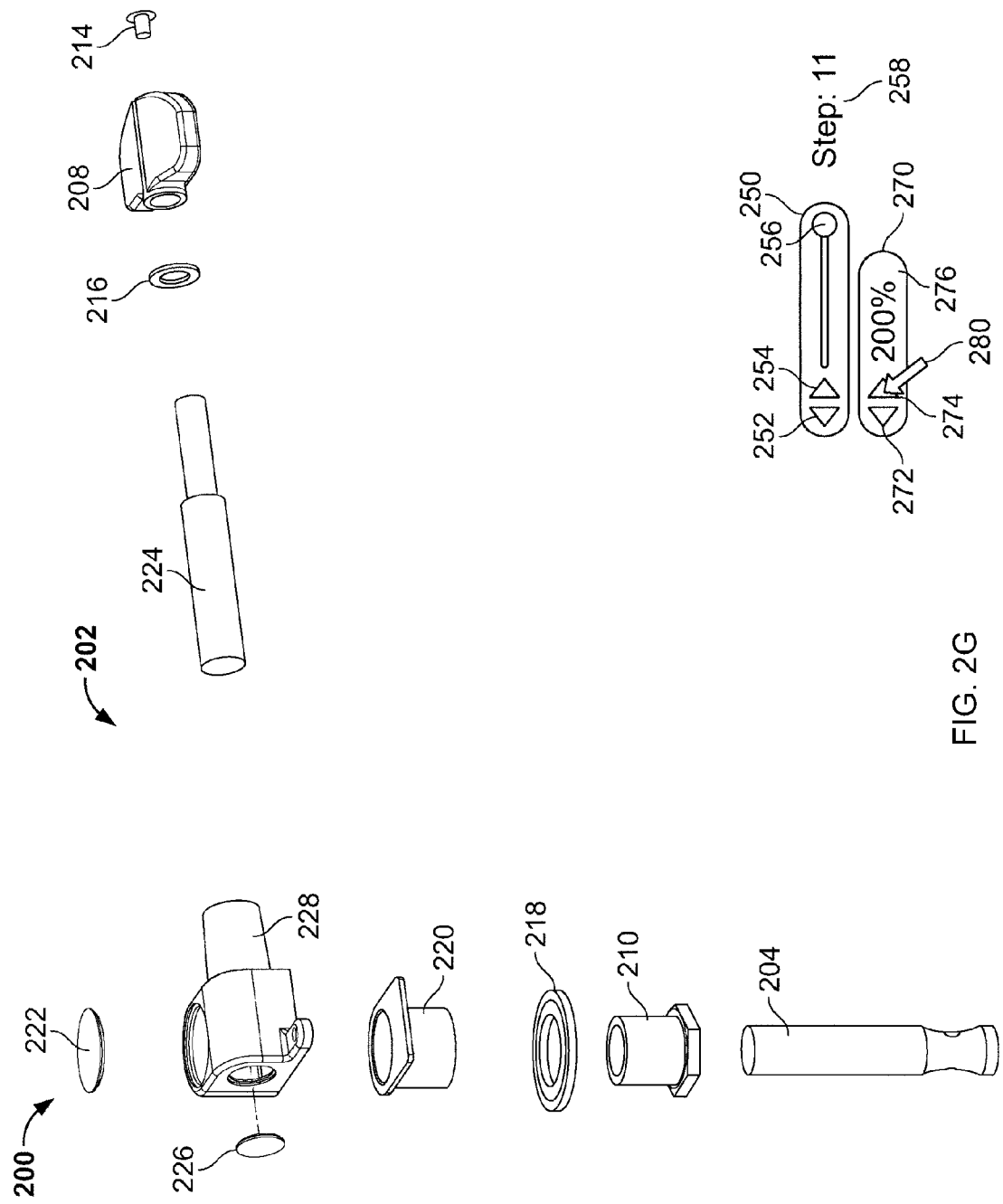

AUTOMATIC EXPLODE BASED ON OCCLUSION

CROSS-REFERENCE TO RELATED APPLICATION

This application under 35 USC §119, claims foreign priority benefit to International Application No. PCT/CN2009/073694, filed Sep. 2, 2009 in the People's Republic of China, the entire contents of which is hereby incorporated by reference.

TECHNICAL FIELD

This document relates to creating three-dimensional renderings showing spatial relationships between components of an object.

BACKGROUND

Computer Aided Design (CAD) software is often used by designers of mechanical components and assemblies to create two-dimensional or three-dimensional renderings of physical objects, components, and assemblies. Such CAD software is often used in the design of a wide variety of tools and machinery. Detailed design and engineering drawings can be created using CAD software. CAD software often allows users to manipulate three-dimensional renderings in order to rotate objects depicted in the renderings and view the objects from multiple angles. Stress tests, strength tests, and dynamic analysis can also be performed on three-dimensional renderings using CAD software.

In many applications, it is often necessary for manufacturing engineers to create assembly instructions and maintenance documentation for tools or machinery designed using CAD software. Often times, an illustration that shows the various components of an assembly separated spatially from each other (i.e. an exploded view) is required in order to create assembly instructions and maintenance documentation. Such three-dimensional exploded views can maintain positional relevance of various components of an assembly, thereby helping users of instruction manuals to more clearly see individual components and the spatial relationships between components.

In many CAD and other three-dimensional rendering software applications, users are able to alter the position of various components of an assembly using a move tool in order to drag components within a rendering and change the position of components with respect to other components in the assembly. Creating an exploded view using this process often requires a large amount of user interaction and a high degree of familiarity with the internal structure of the of the assembly.

SUMMARY

In general, in one aspect, embodiments feature providing a rendering of a three-dimensional assembly of components. An explosion sequence for separating first components of the assembly is determined. The explosion sequence comprises stages in which each stage represents a different spatial relationship between two or more of the first components. A first input is received from an interactive control. A first stage in the explosion sequence is selected based on the first input. The rendering of the assembly is updated, responsive to the first input, to show the first stage of the explosion sequence. A second input is received from the interactive control. A different second stage in the explosion sequence is selected based on the second input. The rendering of the assembly is updated, responsive to the second input, to show the second stage of the explosion sequence. Other embodiments of this aspect include corresponding systems, apparatus, and computer program products.

These and other embodiments can optionally include one or more of the following features. The stages, when rendered in order, can represent a disassembly sequence of the assembly. The control can be a slider control. Input indicating that images of a plurality of stages of the explosion sequence are to be saved can be received. Images of the indicated plurality of stages can be saved. A presentation which includes images of the indicated plurality of stages can be created. The presentation can be an assembly presentation. The assembly presentation can represent a series of steps to be performed when assembling the assembly. The presentation can be a disassembly presentation. The disassembly presentation can represent a series of steps to be performed when disassembling the assembly. The presentation can include an animation that shows at least one component moving between a position depicted in the first stage and a position depicted in the second stage. A third input can be received from a component distance control. A distance between two components in the first or second stage can be adjusted based on the third input.

In general, in another aspect, embodiments feature providing a rendering of a three-dimensional assembly of components. A first separation direction for separating a first component from a second component is determined. Determining the first separation direction includes determining an occlusion ranking for each occlusion view. Determining the first separation direction further includes identifying an occlusion view from the plurality of occlusion views wherein the occlusion ranking of the identified occlusion view satisfies a criterion. Determining the first separation direction further includes selecting the viewing direction associated with the identified occlusion view as the first separation direction. The rendering of the assembly is updated to show the first component spatially separated from the second component by repositioning one of the first component and the second component along the first separation direction. Other embodiments of this aspect include corresponding systems, apparatus, and computer program products.

These and other embodiments can optionally include one or more of the following features. The occlusion ranking can be based on an occlusion percentage of the occlusion view. The occlusion percentage can be the percentage of the first component that is blocked by the second component for a given occlusion view. The identified occlusion view can satisfy the criterion by having a lowest occlusion percentage from among the plurality of occlusion views. The first component can represent a substantially linear component. The identified occlusion view can satisfy the criterion by having a viewing direction that is the same as a major axis of the first component. A second separation direction for separating a third component from the second component can be determined. The rendering of the assembly can be updated to show the second component spatially separated from the third component by repositioning one of the second component and the third component along the second separation direction. The third component can be positioned in an original position associated with the third component in the rendering while the second component is kept positioned about an axis defined by the second separation direction with respect to the third component and the first component is kept positioned about an axis defined by the first separation direction with respect to the second component. The second component can be moved towards an original position associated with the second component in the rendering until the second component reaches a specified distance gap from the third component while the first component is kept positioned about an axis defined by the first separation direction with respect to the second component.

The distance between the second component and the third component can be determined by projecting the second and third components onto a line and measuring the distance on the line between the projections of the second and third components. The line can be parallel to the axis defined by the second separation direction. Updating the rendering of the assembly to show the second component spatially separated from the third component can include moving one of the second and third components a distance greater than the specified distance gap. An input can be received from a component distance control. A new value can be assigned to the specified distance gap based on the input. The second component can be positioned along the axis defined by the second separation direction a distance equivalent to the new specified distance gap from the third component while the first component is kept positioned about an axis defined by the first separation direction with respect to the second component. The first component can be moved towards an original position associated with the first component in the three-dimensional rendering until the first component reaches a specified distance gap from the second component. The first separation direction can be different from the second separation direction. The first separation direction can be less than 90 degrees from the second separation direction.

Implementations can provide any, all or none of the following advantages. Explosion views for assemblies can be created quickly and efficiently. Explosion views can be selected from a plurality of explosion views within an explosion sequence. Assembly and disassembly presentations can be generated quickly and efficiently. Separation directions for separating components can be quickly and accurately determined. Explosion views can be easily controlled and manipulated by a user. Separation distances between components in a three-dimensional rendering can be accurately determined.

The details of one or more implementations are set forth in the accompanying drawings and the description below. Other features and advantages will be apparent from the description and drawings, and from the claims.

DESCRIPTION OF DRAWINGS

FIG. 1A shows a three-dimensional rendering of an example assembly having multiple components, in accordance with some implementations.

FIG. 1B shows an occlusion view from a first angle generated from the three dimensional rendering of FIG. 1A.

FIG. 1E shows a fourth occlusion view from a second angle generated from the three-dimensional rendering of FIG. 1A.

FIG. 1F shows a fifth occlusion view from the second angle generated from the three-dimensional rendering of FIG. 1A.

FIG. 2A shows a first stage in an explosion sequence for a three-dimensional rendering of an assembly having multiple components, in accordance with some implementations.

FIG. 2B shows a second stage of the explosion sequence for the three-dimensional rendering of FIG. 2A.

FIG. 2C shows a third stage of the explosion sequence for the three-dimensional rendering of FIG. 2A.

FIG. 2D shows an fourth stage of the explosion sequence for the three-dimensional rendering of FIG. 2A.

FIG. 2E shows a fifth stage of the explosion sequence for the three-dimensional rendering of FIG. 2A.

FIG. 2F shows a sixth stage of the explosion sequence for the three-dimensional rendering of FIG. 2A.

FIG. 2G shows the sixth stage of the explosion sequence of FIG. 2F with an increased distance between the components of the assembly.

DETAILED DESCRIPTION

Figure 1C:
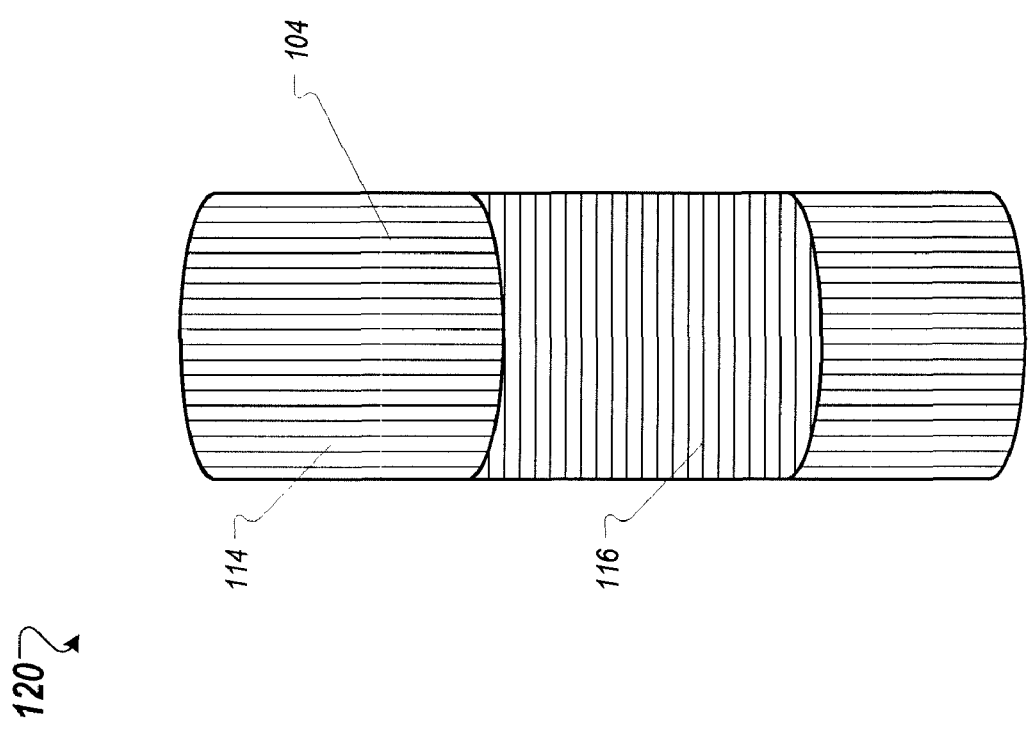
FIG. 1C shows a second occlusion view from the first angle generated from the three-dimensional rendering of FIG. 1A.

Referring to FIG. 1A, in accordance with some implementations, a three-dimensional rendering 100 depicts an example assembly 102 which includes components 104 and 106. In the implementation depicted, the component 104 is a long solid cylinder and the component 106 is a wider, shorter cylinder that defines an internal space. The component 104 passes through the internal space of the component 106 to form the assembly 102. In alternate implementations, assemblies can include dozens, or hundreds of components, however, for simplicity's sake, the current example will refer to the assembly 102 having only two components. In some implementations, the three-dimensional rendering 100 is created using a computer having one or more processors and displayed on a monitor connected to the computer. For example, a laptop computer can be used to create the three-dimensional rendering 100. In some implementations, the three-dimensional rendering 100 is created using Computer Aided Design (CAD) software and is displayed by a software application running on a computer.

Referring now to FIG. 1B, an occlusion view 110 created from the three-dimensional rendering 100 includes renderings of the components 104 and 106. For example, the occlusion view 110 can be created by a computer having one or more processors and displayed on a monitor in communication with the computer. The occlusion view 110 shows a rendering of the assembly 102 from a first viewing angle. Each of the components 104 and 106 of the assembly 102 are depicted as having a different, unique fill pattern, with the component 104 having a first fill pattern 114 and the component 106 having a second fill pattern 116. In some implementations, each component 104 and 106 is given a unique color in the occlusion view. In some implementations in which the assembly 102 includes one or more additional components, each of the components of the assembly 102 is given a unique color, fill pattern, or color/fill pattern combination. Each different fill pattern 114 and 116 in the occlusion view 110 represents the portions of each of the components 104 and 106, respectively, that can be seen from the first viewing angle shown in the occlusion view 110.

The occlusion view 110 indicates which portions of each component 104 and 106 are visually occluded while viewing the assembly 102 from the first viewing angle. For example, a portion of the top surface of the component 106 is blocked from view by the top portion of the component 104. As another example, a middle portion of the component 104 is blocked from view by the component 106 since the component 104 passes through the internal space defined by the component 106. Additionally, a portion of the component 104 that extends from the bottom of the component 106, but is not disposed within the internal space is also blocked from view by the component 106. In the implementation shown, the occlusion view 110 indicates all of the areas of both components 104 and 106 that are visually occluded by the other component 104 or 106 for the first viewing angle, but does not indicate all of the areas in which the components 104 and 106 are physically occluded by the other component 104 or 106 for the first viewing angle. For example, the first component 104 physically blocks a large portion of the backside of the component 106 when viewed at the first viewing angle since the component 104 passes through the component 106. However, this is not indicated by the occlusion view 110.

Referring now to FIG. 1C, in accordance with some implementations, an occlusion view 120 includes a rendering of the component 104 as viewed from the first viewing angle. The fill pattern 116 is used to indicate portions of the component 104 that are physically occluded by the component 106 of the assembly 102 for the first viewing angle. That is, the fill pattern 116 indicates the portion of the component 104 that would be physically blocked by the component 106 if an attempt were made to move the component 104 along the direction of the first viewing angle (e.g. either toward the point of view or away from the point of view of the first viewing angle). The fill pattern 114 is used to indicate portions of the component 104 that are not physically occluded by the component 106. In some implementations in which the assembly 102 includes one or more additional components, the fill pattern 114 may be used to indicate portions of the component 104 that are not physically occluded by any of the other components of the assembly 102. In other implementations in which the assembly 102 includes one or more additional components, the fill pattern 114 may be used to indicate portions of the component 104 that are not physically occluded by just the component 106.

In some implementations, the occlusion view 120 is used to determine an occlusion ranking for the component 104 with respect to the component 106 for the first viewing angle. For example, the occlusion view 120 can be assigned an occlusion ranking on a scale of one to ten, with ten being completely physically occluded and a ranking of one representing no physical occlusion. As another example, an occlusion percentage is assigned to the occlusion view 120 as the occlusion ranking. The occlusion percentage can be the percentage of the component 104 that is physically blocked by the component 106 from the first viewing angle. As yet another example, the occlusion ranking is a binary ranking, with an occlusion ranking of one being assigned if there is any physical occlusion of the component 104 and a occlusion ranking of zero assigned if there is no physical occlusion.

In some implementations, occlusion views for the component 104 are created for a plurality of viewing angles. These various occlusion views can be used to assign occlusion rankings for each of the plurality of viewing angles. The occlusion rankings can be compared to each other in order to determine one or more viewing angles for which the component 104 is the least physically blocked by the component 106. In some implementations in which the assembly 102 includes one or more additional components, the occlusion rankings for each of the plurality of viewing angles are compared to each other in order to determine one or more viewing angles for which the component 104 is the least physically blocked by any of the other components of the assembly 102.

Figure 1D:
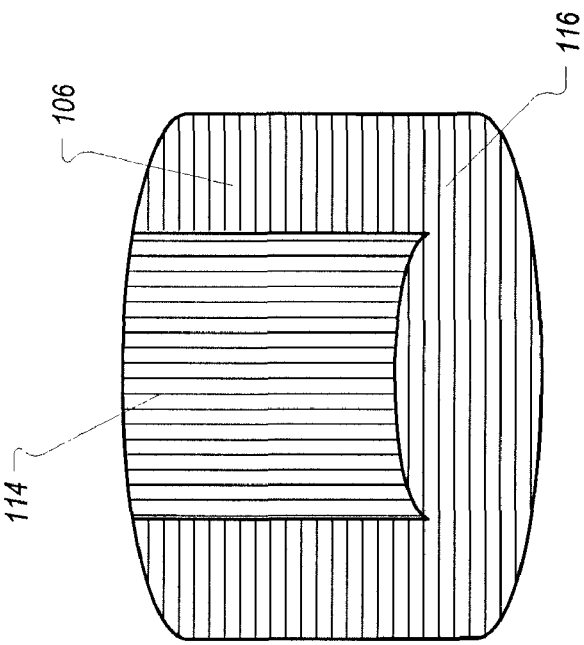
FIG. 1D shows a third occlusion view from the first angle generated from the three-dimensional rendering of FIG. 1A.

Referring now to FIG. 1D, in accordance with some implementations, an occlusion view 130 includes a rendering of the component 106 as viewed from the first viewing angle. The fill pattern 114 is used to indicate portions of the component 106 that are physically occluded by the component 104 of the assembly 102 for the first viewing angle. The fill pattern 114 indicates one or more portions of the component 106 that would be physically blocked by the component 104 if an attempt were made to move the component 106 along the direction of the first viewing angle (e.g. either toward the point of view or away from the point of view of the first viewing angle). The fill pattern 116 indicates portions of the component 106 that are not physically occluded by the component 104. In some implementations in which the assembly 102 includes one or more additional components, the fill pattern 116 may be used to indicate portions of the component 106 that are not physically occluded by any of the other components of the assembly 102. In other implementations in which the assembly 102 includes one or more additional components, the fill pattern 116 can indicate portions of the component 106 that are not physically occluded by just the component 104.

The occlusion view 130 can be used to assign an occlusion ranking for the component 106 with respect to the component 104 for the first viewing angle. For example, an occlusion percentage is calculated for the occlusion view 130 by calculating a percentage of the area of the rendering of the component 106 that includes the first fill pattern 114. This percentage indicates the percentage of the component 106 that is physically blocked by the component 104. In this example, the calculated percentage is assigned to the occlusion view 130 as the occlusion ranking. In some implementations, occlusion views for the component 106 are created for a plurality of viewing angles. These various occlusion views are used to assign occlusion rankings for each of the plurality of viewing angles, in such implementations. The occlusion rankings can be compared to each other in order to determine one or more viewing angles for which the component 104 is the least physically blocked by the component 106. In some implementations in which the assembly 102 includes one or more additional components, the occlusion rankings for each of the plurality of viewing angles are compared to each other in order to determine one or more viewing angles for which the component 104 is the least physically blocked by any of the other components of the assembly 102.

The occlusion view 130 gives a better indication of the areas of the component 106 that are physically blocked by the component 104 (and therefore, a more accurate occlusion ranking) than the occlusion view 110 depicted in FIG. 1B. Since the occlusion view 110 only indicates the portions of the component 106 that are visually occluded by the component 104, only a small percentage of the viewable area of the component 106 is shown as being occluded in the occlusion view 110, whereas the occlusion view 130 gives a more accurate representation of the percentage of the component 106 that is blocked by the component 104. The more accurate representation given by the occlusion view 130 leads to a more accurate occlusion ranking being determined for the first viewing angle than if the occlusion view 110 is used to determine an occlusion ranking for the first viewing angle.

Referring now to FIG. 1E, an occlusion view 140 created from the three-dimensional rendering 100 (FIG. 1A) includes renderings of the components 104 and 106. The occlusion view 140 indicates portions of the components 104 and 106 that are visible when the assembly 102 is viewed from a second viewing angle, the second viewing angle being different than the first viewing angle. The first fill pattern 114 indicates portions of the component 104 that are visible from the second viewing angle while the second fill pattern 116 indicates portions of the component 106 that are visible from the second viewing angle. In some implementations, each component 104 and 106 is given a unique color or color/fill pattern combination in the occlusion view 140.

The occlusion view 140 indicates portions of each component 104 and 106 that are visually occluded while viewing the assembly 102 from the second viewing angle. For example, a middle portion of the component 104 is blocked from view by the component 106 since the component 104 passes through the internal space defined by the component 106. In the implementation shown, the occlusion view 110 indicates all of the areas of both components 104 and 106 that are visually occluded by the other component 104 or 106 for the first viewing angle, but does not indicate all of the areas in which the components 104 and 106 are physically occluded by the other component 104 or 106 for the first viewing angle. For example, the occlusion view 140 indicates that no portions of the component 106 are visually occluded when viewing the assembly 102 from the second viewing angle. In some implementations, an occlusion view created from the second viewing angle in which the component 106 is positioned completely in front of the component 104, rather than encircling the component 104, would appear the same as the occlusion view 140. Therefore, determining an occlusion ranking for the component 106 with respect to the component 104 for the second viewing angle using the occlusion view 140 may lead to an inaccurate representation of how much of the component 106 is blocked by the component 104 and whether or not the component 106 can be separated from the component 104 by moving the component 106 along the direction of the second viewing angle. For example, the first component 104 physically blocks a large portion of the backside of the component 106 when viewed at the second viewing angle since the component 104 passes through the component 106. However, this is not indicated by the occlusion view 140.

Referring now to FIG. 1F, in accordance with some implementations, an occlusion view 150 includes a rendering of the component 106 as viewed from the second viewing angle. The fill pattern 114 is used to indicate portions of the component 106 that are physically occluded by the component 104 of the assembly 102 for the second viewing angle. The fill pattern 114 indicates one or more portions of the component 106 that would be physically blocked from moving by the component 104 if an attempt were made to move the component 106 along the direction of the second viewing angle. The fill pattern 116 indicates portions of the component 106 that are not physically occluded by the component 104.

In some implementations, the occlusion view 150 is used to determine an occlusion ranking for the component 106 with respect to the component 104 for the second viewing angle. For example, the occlusion view 150 can be assigned a ranking from a spectrum of rankings consisting of "Fully Blocked", "Mostly Blocked", "Partially Blocked", and "Not Blocked." As another example, an occlusion percentage is calculated for the occlusion view 150 by calculating a percentage of the area of the rendering of the component 106 that includes the first fill pattern 114. This percentage indicates the percentage of the component 106 that is physically blocked by the component 104. In this example, the calculated percentage is assigned to the occlusion view 150 as the occlusion ranking. In some implementations, the occlusion percentage determined for the occlusion view 150 is compared to the occlusion percentage determined for the occlusion view 130 (FIG. 1D) as well as a plurality of occlusion percentages calculated for occlusion views associated with various viewing angles for the assembly 102. Comparing the occlusion percentage for the occlusion views 130 and 150 can indicate that a larger percentage of the component 106 is physically occluded by the component 104 when the assembly 102 is viewed from the second viewing angle than when the assembly 102 is viewed from the first viewing angle. This comparison can indicate that the component 106 can be more readily separated from the component 104 along the direction of the first viewing angle than along the direction of the second viewing angle.

Still referring to FIG. 1F, the occlusion view 150 gives a more accurate indication of the areas of the component 106 that are physically blocked by the component 104 (and therefore, a more accurate occlusion ranking) than the occlusion view 140 (FIG. 1E). The occlusion view 140 shows no occlusion of the component 106, whereas the occlusion view 150 gives a more accurate representation of the percentage of the component 106 that is blocked by the component 104 by indicating with the fill pattern 114 the portions of the component 106 that are physically blocked by the component 104. The more accurate representation given by the occlusion view 150 leads to a more accurate occlusion ranking being determined for the second viewing angle than if the occlusion view 140 is used to determine an occlusion ranking for the second viewing angle.

Figure 1G:
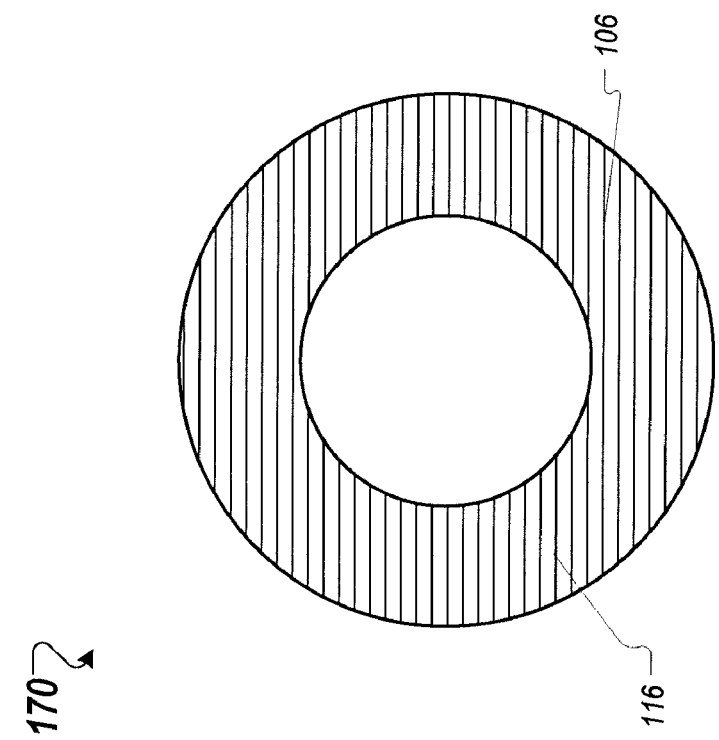
FIG. 1G shows a sixth occlusion view from a third angle generated from the three-dimensional rendering of FIG. 1A.

Referring now to FIG. 1G, in accordance with some implementations, an occlusion view 160 created from the three-dimensional rendering 100 (FIG. 1A) includes renderings of the components 104 and 106. The occlusion view 160 indicates portions of the components 104 and 106 that are visible when the assembly 102 is viewed from a third viewing angle, the third viewing angle being different than the first and second viewing angles. The first fill pattern 114 indicates portions of the component 104 that are visible from the third viewing angle while the second fill pattern 116 indicates portions of the component 106 that are visible from the third viewing angle. In some implementations, each component 104 and 106 is given a unique color or color/fill pattern combination in the occlusion view 160.

Figure 1H:
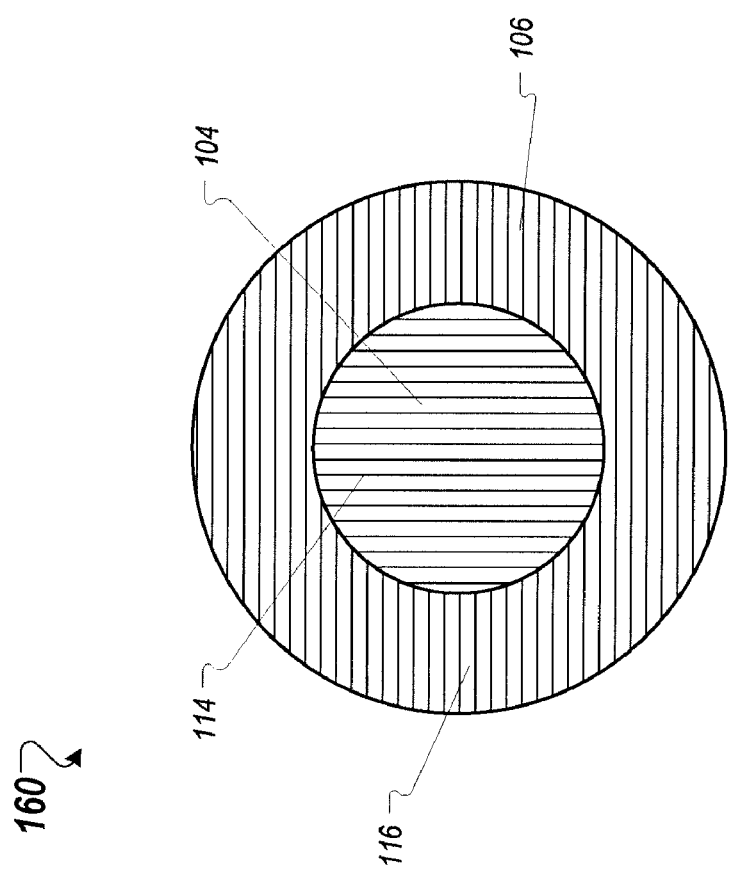
FIG. 1H shows a seventh occlusion view from the third angle generated from the three-dimensional rendering of FIG. 1A.

Referring to FIG. 1H, an occlusion view 170 includes a rendering of the component 106 as viewed from the third viewing angle. The fill pattern 116 indicates portions of the component 106 that are not physically occluded by the component 104. The occlusion view 170 does not include any portions that contain the fill pattern 114. This indicates that there are no portions of the component 106 that are physically occluded by the component 104 when the assembly 102 is viewed from the third viewing angle.

In some implementations, the occlusion view 170 is used to determine an occlusion ranking for the component 106 with respect to the component 104 for the third viewing angle. For example, an occlusion percentage is calculated for the occlusion view 170 by calculating a percentage of component 106 that is physically blocked by the component 104 when the assembly 102 is viewed from the third angle. In this example, the occlusion percentage for the component 106 for the third viewing angle is zero since there are no portions of the component 106 that are physically occluded for the third viewing angle. In some implementations, the calculated percentage is assigned to the occlusion view 170 as the occlusion ranking for the component 106 when viewed from the third viewing angle. In some implementations, the occlusion percentage determined for the occlusion view 170 is compared to occlusion percentages determined for the occlusion view 130 (FIG. 1D) and the occlusion view 150 (FIG. 1F). In some implementations, the occlusion percentage determined for the occlusion view 170 is further compared to occlusion percentages determined for a plurality of other occlusion views for the assembly 102. The occlusion percentages for the various occlusion views to determine one or more viewing angles for which there is the least, or possibly zero, physical occlusion of the component 106. This comparison can indicate that the component 106 can be more readily separated from the component 104 along the direction of the third viewing angle than along the directions of the first and second viewing angles since there is no occlusion of the component 106 for the occlusion view 170.

In some implementations, the direction of a viewing angle that is associated with a best occlusion ranking (e.g. a lowest occlusion percentage) of a plurality of viewing angles is selected as a separation direction for separating a first component from a second component in a three dimensional rendering of an assembly in order to create an exploded view of the assembly. For example, the component 106 can be separated from the component 104 along the direction of the third viewing angle since the occlusion view 170 indicates that the component 106 is not physically occluded by the component 104 for the third viewing angle. In this example, the direction of the third viewing angle is the separation direction for separating the component 106 from the component 104. The components 104 and 106 can be separated in the three-dimensional rendering 100 (FIG. 1) by moving the component 106 toward the point of view of the third viewing angle or by moving the component 104 away from the point of view of the third viewing angle. In some implementations, separating the components 104 and 106 includes moving one of the components 104 or 106 until the two components are a specified distance apart. In some implementations, this specified distance is predetermined. In other implementations, the specified distance is based on user input. For example, a user of a CAD software application can indicate a distance gap for positioning the component 106 in relation to the component 104 in an exploded view of the assembly 102.

In some implementations, two components in an assembly are separated along an identified separation direction by a significantly large distance (e.g. an infinite distance). An exploded view of the assembly is then created by moving a first of the two components toward the other of the two components until the first component is a specified distance from the other component. For example, the component 106 is separated from the component 104 by moving the component 106 a significantly large distance in the identified separation direction defined by the third viewing angle. An exploded view of the assembly 102 is then created by moving the component 106 toward the component 104 in the three-dimensional rendering 100 until the component 106 reaches a specified distance gap from the component 104.

In some implementations, a separation direction for separating two components in an assembly is based on an occlusion ranking other than occlusion percentage. For example an assembly includes a substantially linear component, such as a nut, bolt, screw, nail, pin, etc. An occlusion view associated with an occlusion angle having a direction that is the same as the major access of the substantially linear component can be assigned a "top" or "best" occlusion ranking from among a plurality of occlusion views for the assembly. In this example, the major axis of the substantially linear component is determined as the separation direction for separating the substantially linear component from one or more other components of the assembly. Using a major axis of a substantially linear component to identify a separation direction can be especially helpful when the substantially linear component is a screw or other threaded fasteners, since the threads of the substantially linear component will always be at least partially physically occluded for any viewing angle of the assembly. In some implementations, occlusion views are not needed when determining a separation direction for separating a substantially linear component from one or more other components of an assembly. In such implementations, the major axis of the substantially linear component is identified as having an occlusion ranking that satisfies a separation criteria and is selected as the separation direction with out the use of occlusion views.

Referring now to FIG. 2A, in accordance with some implementations, a display depicts a three-dimensional rendering 200 of an assembly 202 as well as a first interactive control 250 and a second interactive control 270. In some implementations, the display is generated by a computer having one or more processors and displayed on a monitor connected to the computer. In some implementations, a software application, such as Computer Aided Design (CAD) software, is used to generate the display.

The assembly 202 is composed of a plurality of components. In FIG. 2A, the assembly 202 is depicted in an assembled state. The components engage each other to form the assembled assembly 202. The fully assembled state represents the first step in an explosion sequence for the assembly 202. An explosion sequence is a set of images depicting the assembly 202 in which various components of the assembly 202 are arranged in different various spatial relationships with respect to each other. For example, FIG. 2A depicts a first stage in an explosion sequence for the assembly 202 and FIG. 2B depicts a second stage in the explosion sequence. In FIG. 2A, the assembly 202 is shown in an assembled state. In FIG. 2B, the assembly 202 is shown with a component 204 spatially separated from the remaining components of the assembly 202. The remaining components of the assembly 202 form a sub-assembly 206. The sub-assembly 206 includes all of the components of the assembly 202 except for the component 204. In some implementations, the components of the sub-assembly 206 are positioned in an assembled state relative to each other.

In some implementations, the various stages of the explosion sequence, when presented in order, represent a disassembly sequence for the assembly 202. The disassembly sequence indicates an order for disassembling the components of the assembly 202 from each other. In some implementations, the stages of the explosion sequence can be presented in a reverse order to represent an assembly sequence for the assembly 202. The assembly sequence indicates an order for assembling the components of the assembly 202 in order to create an assembled version of the assembly 202 as shown in FIG. 2A.

In some implementations, a separation direction for separating the component 204 from the sub-assembly 206 is determined before separating the component 204 from the sub-assembly 206. For example, a plurality of occlusion views for a variety of viewing angles can be generated. Each of the plurality of occlusion views can visually portray portions of the component 204 that are physically occluded by the sub-assembly 206, or portions of the sub-assembly 206 that are physically occluded by the component 204. Each occlusion view can be assigned an occlusion ranking. For example, an occlusion percentage representing the percentage of the component 204 that is physically occluded by the sub-assembly 206 can be calculated and assigned to each occlusion view.

The direction of the viewing angle of the occlusion view having the lowest occlusion percentage is selected as the separation direction for separating the component 204 from the sub-assembly 206. In some implementations, an occlusion ranking metric other than an occlusion percentage is used to select a separation direction. For example, the component 204 as shown in FIG. 2B is a substantially linear component. The major axis of the component 204 can be selected as the separation direction for separating the component 204 from the sub-assembly 206.

In some implementations, the component 204 is separated from the sub-assembly 206 by moving the component 204 along the separation direction within the three-dimensional rendering 200. In some implementations, the component 204 is moved within the three-dimension rendering until the component 204 and the sub-assembly 206 are a specified distance apart. In some implementations, this specified distance is predetermined. In other implementations, the specified distance is based on user input. For example, a user of a CAD software application can indicate a distance gap for positioning the component 204 in relation to the sub-assembly 206 in the second stage of the explosion sequence. As another example, the second interactive control 270 can be used to specify a relative distance gap between the component 204 and the sub-assembly 206. A user can use buttons 272 and 274 of the second interactive control 270 to increase or decrease the distance gap between the component 204 and the sub-assembly 206. For example, a user can use a cursor 280 to select the button 274 to increase the distance gap between the component 204 and the sub-assembly 206. In some implementations, the component 204 and the sub-assembly 206 are separated along the selected separation direction by a significantly large distance (e.g. an infinite distance). An exploded view shown in FIG. 2B for the second stage of the explosion sequence is then created by moving the component 204 toward the sub-assembly 206 within the three-dimensional rendering 200 until the component 204 is a specified distance from the sub-assembly 206.

In some implementations, the explosion sequence for the assembly 202 is determined by analyzing a plurality of occlusion views associated with the three-dimensional rendering 200 of the assembly 202. In some implementations, the occlusion views are pre-stored images of the assembly 202 when viewed from a plurality of different viewing angles. In other implementations, the occlusion views are generated dynamically using the three-dimensional rendering 200. Occlusion views are associated with a plurality of viewing angles. For each different viewing angle, a separate occlusion view for each component of the assembly 202 can be created. The occlusion view associated with a particular viewing angle and component can visually depict the areas of the component that are physically occluded by the other components of the assembly 202, as described above with reference to FIGS. 1A-1H. An occlusion ranking can then be associated with each occlusion view. For example, an occlusion ranking selected from the list of Best, Good, Poor, or Low is associated with each occlusion view. As another example, an occlusion percentage is assigned to each occlusion view.

In some implementations, the occlusion rankings for each of the plurality of occlusion views are compared to each other and an occlusion view having a best occlusion ranking (e.g. a lowest occlusion percentage) is identified. The component associated with the identified occlusion view can be selected as the next component to be separated from the assembly 202 and the viewing angle associated with the identified occlusion view can be selected as the separation direction for separating the selected component from the remaining components in the assembly 202. For example, an occlusion view that indicates which portions of the component 204 are physically occluded by the other components of the assembly 202 can be identified as having a best occlusion ranking. For example, the occlusion view associated with the component 204 may have a lower occlusion percentage than any occlusion views associated with a component 208. In this example, the component 204 can be identified as a better candidate for separation from the assembly 202 than the component 208. This comparison can be performed between occlusion views associated with the component 204 and occlusion views associated with other components of the assembly 202. Upon being identified as a best candidate for separation from the remaining components of the assembly 202, in some implementations, the component 204 is separated from the remaining components along the direction of the viewing angle of the identified occlusion view.

In some implementations, components within an assembly can be grouped together and considered as one component for the purposes of determining a separation order of components or a separation direction for the group of components. For example, an assembly can include a number of bolts for fastening a first plate component of the assembly to a main structure of the assembly. The bolts can be grouped together as a component group and considered as one component for the purposes of determining a separation order for the assembly and for determining a separation direction for the bolts. This can improve the efficiency of a component separation method by reducing the total number of separation steps to be performed.

In some implementations, after a first candidate component for separation from the assembly 202 is identified and separated from the remaining components of the assembly 202, a second candidate component for separation from the assembly 202 is identified. For example, referring to FIG. 2B, occlusion views associated with the sub-assembly 206 can be analyzed to determine a next separation candidate component. In some implementations, the occlusion views for determining the next separation candidate component will not include the component 204 since the component 204 is already separated from the sub-assembly 206. The occlusion views are generated for a plurality of different viewing angles. For each different viewing angle, a separate occlusion view for each component of the sub-assembly 206 can be created. The occlusion view associated with a particular viewing angle and component can visually depict the areas of the component that are physically occluded by the other components of the sub-assembly 206, as described above with reference to FIGS. 1A-1H. An occlusion ranking can then be associated with each occlusion view. A component associated with an occlusion view having a best occlusion ranking can be identified as the next separation candidate component.

For example, an occlusion view associated with a component 210 can be identified as having a best occlusion ranking among all occlusion views associated with the sub-assembly 206. The component 210 is then identified as the next separation candidate component. Referring to FIG. 2C, a third stage of the explosion sequence, which represents a third step in the explosion sequence, is displayed. The third stage shows the component 210 separated spatially within the three-dimensional rendering 200 from the remaining components of the sub-assembly 206. The remaining components of the sub-assembly 206 make up a sub-assembly 212. The component 210 is separated from the sub-assembly 212 along a separation direction. For example, the separation direction can be the viewing angle of an occlusion view associated with a best occlusion ranking for the sub-assembly 206 of FIG. 2B.

In the example depicted in FIG. 2C, the separation direction associated with the component 210 happens to be the same as the separation direction associated with the component 204. In some implementations, the component 210 is separated from the sub-assembly 212 along the separation direction identified for the component 210 a specified distance gap from the sub-assembly 212. In some implementations, the distance of separation between the component 210 and the sub-assembly 212 is less than the distance of separation between the component 204 and the sub-assembly 212 so that the component 210 is positioned between the component 204 and the sub-assembly 212 without being in contact with either the component 204 or the sub-assembly 212.

In some implementations, occlusions views associated with two different components of the sub-assembly 206 can have the same occlusion ranking, and furthermore, this same occlusion ranking can be the best occlusion ranking. For example, both the component 208 and the component 210 may be associated with occlusion views in which the occlusion percentage is 0%. In some of such implementations, the next candidate component for separation can be selected randomly from among the components associated with occlusion views having the same occlusion ranking in which this same occlusion ranking is also the best occlusion ranking. In other implementations, a component having a separation direction that is most similar to a separation direction for a previously separated component can be identified as the next candidate component for separation. For example, if the components 208 and 210 are both associated with occlusion views having occlusion percentages of 0%, the component 210 can be identified as the next candidate component for separation since an identified separation direction for the component 210 is closer to the separation direction for the component 204 than an identified separation direction for the component 208.

In some implementations, various different stages of the explosion sequence are displayed in response to input provided by a user. For example, input can be received from the first interactive control 250. A user can use the first interactive control 250 to select a stage of the explosion sequence that is to be displayed. For example, user can use a mouse, keyboard, trackball, touch pad, touch screen, or other input device to control the cursor 280 or otherwise select a button 254 of the first interactive control 250 in order to advance the explosion sequence from the first stage depicted in FIG. 2A to the second stage depicted in FIG. 2B. The button 254 can be selected again to advance the explosion sequence from the second stage depicted in FIG. 2B to the third stage depicted in FIG. 2C. The user can then select a button 252 to move back to the second stage of the explosion sequence from the third stage of the explosion sequence. As another example, a slider control 256 of the first interactive control 250 can receive input for selecting between various stages of an explosion sequence. In the example depicted, the first step in the explosion sequence is displayed when the slider control 256 is positioned in a left most position. As the slider control is moved to the right of the first interactive control 250, the explosion sequence for the assembly 202 is advanced. Sliding the slider control 256 one position to the right causes the explosion sequence to advance from the first stage depicted in FIG. 2A to the second stage depicted in FIG. 2B.

In some implementations, the first interactive control 250 includes a text field 258. The text field 258 can indicate a step of the explosion sequence that is currently being displayed. For example, in FIG. 2A, the text field 258 indicates that the first step in the explosion sequence is being displayed. As another example, in FIG. 2B, the text field 258 indicates that the second step in the explosion sequence is being displayed.

In some implementations, the text field 258 can be selected to allow a user to manually enter a step number to display. For example, a user can select the text field 258 and use a keyboard to type in "6." The sixth step in the explosion sequence for the assembly 202 can then be displayed in response to the user input.

Referring now to FIG. 2D, a fourth stage of the explosion sequence, which depicts the eighth step of the explosion sequence, is shown. As compared to FIG. 2C, FIG. 2D shows several more components of the assembly 202 separated from the remaining components of the assembly 202. In step eight of the explosion sequence, the component 208 as well as components 214, 216, 218, and 220 have been separated from the remaining components of the assembly 202. A separation order and separation directions for the components 208, 214, 216, 218, and 220 can be determined as described above with reference to FIGS. 2A-2C. Each of the components 208, 214, 216, 218, and 220 are separated along their respective associated separation directions a specified distance from the remaining components of the assembly 202. In some implementations, the eight step is displayed in response to user input. For example, a user can use a cursor or touch screen to select or "click on" the button 254 several times to advance the explosion sequence from the third step depicted in FIG. 2C to the eighth step depicted in FIG. 2D. As another example, a user can select the text field 258 of the first interactive control 250 and enter the numeral "8" in order to advance to the eighth step in the explosion sequence.

Referring now to FIG. 2E, a fifth stage of the explosion sequence, which depicts the tenth step of the explosion sequence, is shown. In the example shown, the tenth step of the explosion sequence is the second to last step of the explosion sequence for the assembly 202. As compared to the eighth step of the explosion sequence shown in FIG. 2D, the tenth step of the explosion sequence shown in FIG. 2E shows components 222 and 224 separated from the remaining components of the assembly 202. A separation order and separation directions for the components 222 and 224 can be determined as described above with reference to FIGS. 2A-2C. In FIG. 2E, components 226 and 228 of the assembly 202 are shown in an assembled state relative to each other with the rest of the components of the assembly 202 (i.e. components 204, 208, 210, 214, 216, 218, 220, 222, and 224) separated spatially from each other within the three-dimensional rendering 200. In some implementations, a plurality of occlusion views created from a plurality of viewing angles that indicate portions of the component 226 that are physically blocked by the component 228 are analyzed in order to determine a separation direction for separating the component 226 from the component 228.

Upon identification of a separation direction, the component 226 is separated from the component 228 within the three-dimensional rendering 200 in order to create the next step in the explosion sequence as shown in FIG. 2F. FIG. 2F depicts the eleventh and final step of the explosion sequence. In the eleventh step of the explosion sequence, all of the components of the assembly 202 are spatially separated from one another with none of the components being in contact with any of the other components of the assembly 202. In some cases, the assembly 202 as shown in FIG. 2F is referred to as being in a fully disassembled state. In some implementations, a user can use the first interactive control 250 to move between steps in the explosion sequence. For example, while viewing step eleven of the explosion sequence, as shown in FIG. 2F, the user can select the button 252 to step back through the explosion sequence and cause step ten of the explosion sequence, as shown in FIG. 2E, to be displayed. As another example, the user can slide the slider control 256 towards the left of the display in order to cause an earlier step in the explosion sequence to be displayed.

In the example depicted in FIGS. 2A-2H, the separation directions for separating the components of the assembly 202 from the remaining components of the assembly 202 are generally increments of 90% from each other. In this particular example, this relationship is due to the specific configuration of the assembly 202. In other implementations, the separation directions for various components can be less or more than 90% away from each other. This is because the separation directions for the components are not based on a coordinate system, the separation directions can be any direction for which an occlusion ranking of an occlusion view associated with the direction meets a specified criterion.

Referring now to FIG. 2G, the assembly 202 is shown in a fully disassembled state with each of the components spatially separated from each of the other components of the assembly 202. The distance gaps between each of the components as shown in FIG. 2G is greater than the distance gaps shown between the components in FIG. 2F. In some implementations, the distance gaps between the components is increased in response to input received from the second interactive control 270. For example, a user can use the cursor 280 to select or "click on" the button 274 one or more times in order to increase the relative distance gaps between the components of the assembly 202. As another example, the second interactive control 270 can include a text field 276 that displays a distance gap percentage. The user can select the text field 276 and enter "200" into the text field 276 in order to change the relative distance gaps to 200% of default relative distance gap values. As yet another example, a user can select the button 272 to decrease the relative distance gaps between the components of the assembly 202. In some implementations, the text field 276 displays a unit of distance for the distance gaps, for example "2 inches" or "30 cm." In such implementations, the value of the distance gaps can be changed using the buttons 272 and 274 or by typing a new value into to the text field 276.

In some implementations, distance gap settings can be changed for a subset of the components of the assembly 202 without changing distance gaps for all of the components of the assembly 202. For example, the components 208 and 214 can be selected or otherwise indicated. The second interactive control 270 can then be used to increase or decrease the distance gap between the components 208 and 214. As another example, the components 210 and 218 are selected or otherwise indicated. A user can select the button 274 to increase the distance gap between the components 210 and 218. In some implementations, increasing the distance gap between the components 210 and 218 from a first distance gap to a second distance gap includes moving the component 210 along a separation direction associated with the component 210 until the distance between the components 210 and 218 is equal to the second distance gap. In some implementations, increasing the distance gap between the components 210 and 218 includes moving the component 204 in a direction that is parallel to the separation direction associated with the 210 so that the component 204 maintains a consistent spatial relationship with respect to the component 210. In some implementations, components of the assembly 202 can be manually moved within the three-dimensional rendering 200. For example, a user can select the component 224 using the cursor 280 and drag the component 224 to a new location within the three-dimensional rendering 200.

In some implementations, specified distance gap settings are applied to all stages within an explosion sequence. For example, the distance gap ratio for the assembly 202 can be increased from 100% to 200% using the second interactive control 270. Following this example, the first interactive control 250 can be used to step through the explosion sequence. As various stages of the explosion sequence are displayed, the distance gaps between separated components will be shown at 200% of standard distance gap values for each stage in the explosion sequence. In other implementations, changes to distance gap settings are only applied to one or more indicated stages of an explosion sequence. In some implementations, the three-dimensional rendering 200 can be rotated for each stage of an explosion sequence so that the assembly 202 can be viewed from a plurality of different viewing angles. For example, referring to FIG. 2C, a user can manipulate rotation controls to rotate the third stage of the explosion sequence to view the assembly 202 from a variety of angles. In some implementations, the rotation of the three-dimensional rendering 200 will be maintained as various steps of the explosion sequence are displayed.

Referring to FIGS. 2A-2G, in accordance with some implementations, images of one or more of the stages of the explosion sequence can be generated. The generated images can then be stored and arranged in an order to create an assembly presentation for the assembly 202. In instances in which the order of the images in the assembly presentation is the same as the order of the steps in the explosion sequence, the assembly presentation indicates a disassembly sequence for the assembly 202. In instances in which the order of the images in the assembly presentation is reverse of the order of the steps in the explosion sequence, the assembly presentation indicates an assembly sequence for the assembly 202. In some implementations, a play back speed for displaying the images of the assembly presentation can be specified by a user. In some implementations, the assembly presentation includes animation to show the components moving with relation to each other as the stages of the explosion sequence are displayed. For example, if the images of the assembly presentation are ordered to show an assembly sequence for the assembly 202, an image of the assembly 202 as shown in FIG. 2B will be displayed before an image of the assembly 202 as shown in FIG. 2A. Following this example, the assembly presentation can include animation showing the component 204 moving from the position shown in FIG. 2B to the position shown in FIG. 2A.

Figure 3:
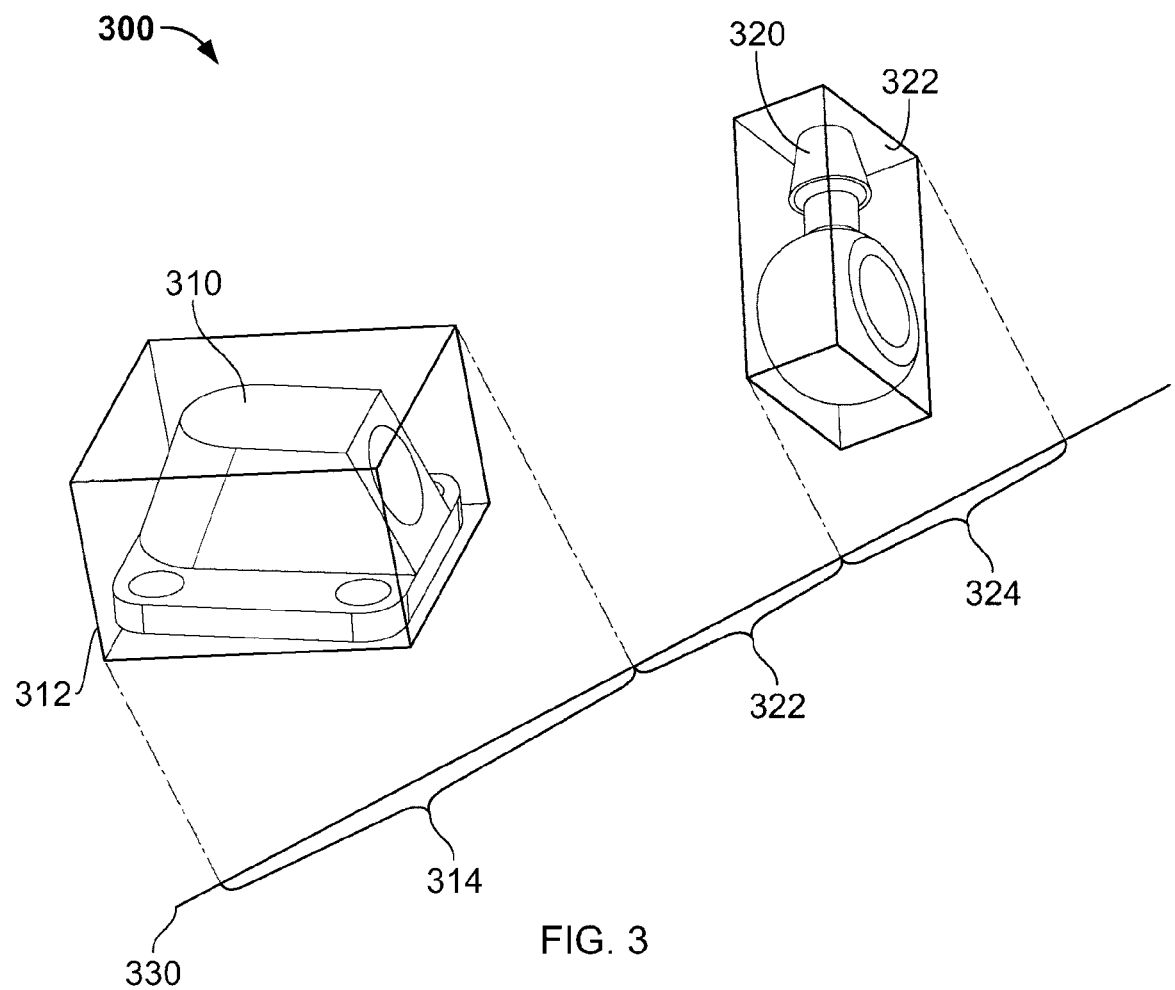
FIG. 3 shows three-dimensional renderings of objects being projected onto a one-dimensional line.

Referring now to FIG. 3, a three-dimensional rendering 300 shows components 310 and 320. For example, the components 310 and 320 are components of an assembly. In some implementations, the components 310 and 320 may be components of an assembly that includes a plurality of additional components. The components 310 and 320 are spatially separated from each other. For example, the depiction of the spatial relationship between the components 310 and 320 as shown in FIG. 3 may be a portion of a stage in an explosion sequence for an assembly that includes the components 310 and 320.

As described above, two components within an assembly can be separated by moving one component along a separation direction until a distance between the two components is equal to a specified distance gap. For example, the component 320 can be separated from the component 310 by moving the component 320 along a identified separation direction until the distance between the components 310 and 320 equals a specified distance gap. In some implementations, the distance between the components 310 and 320 is determined by creating one dimensional projections of the components 310 and 320. A one dimensional projection of the component 310 can be created by creating rectangular prism 312 that circumscribes the component 310. In some implementations, the rectangular prism 312 is the smallest rectangular prism that still fully encases the component 310. The rectangular prism 312 is projected onto a line 330 to create a one-dimensional projection 314 of the component 310. In some implementations, the line 330 is parallel to the identified separation direction for separating the component 320 from the component 310. In some implementations, the line 330 is a major axis of a coordinate system, such as an x, y, or z axis. In some implementations, the orientation of the line 330 is selected randomly or pseudo-randomly.

A one-dimensional projection of the component 320 can be created by creating a rectangular prism 322 that fully circumscribes the component 320. In some implementations, the rectangular prism 322 is the smallest rectangular prism that fully surrounds the component 320. The rectangular prism 322 is projected onto the line 330 to create a one-dimensional projection 324 of the component 320. A distance 332 is measured along the line 330 between the one-dimensional projection 314 and the one-dimensional projection 324. The distance between the components 310 and 320 can be defined as the distance 332 between the one-dimensional projections 314 and 324. In some implementations, when the component 322 is separated from the component 312, the component 322 is moved along the separation direction until the distance 332 is equal to a specified distance gap.

Figure 4:
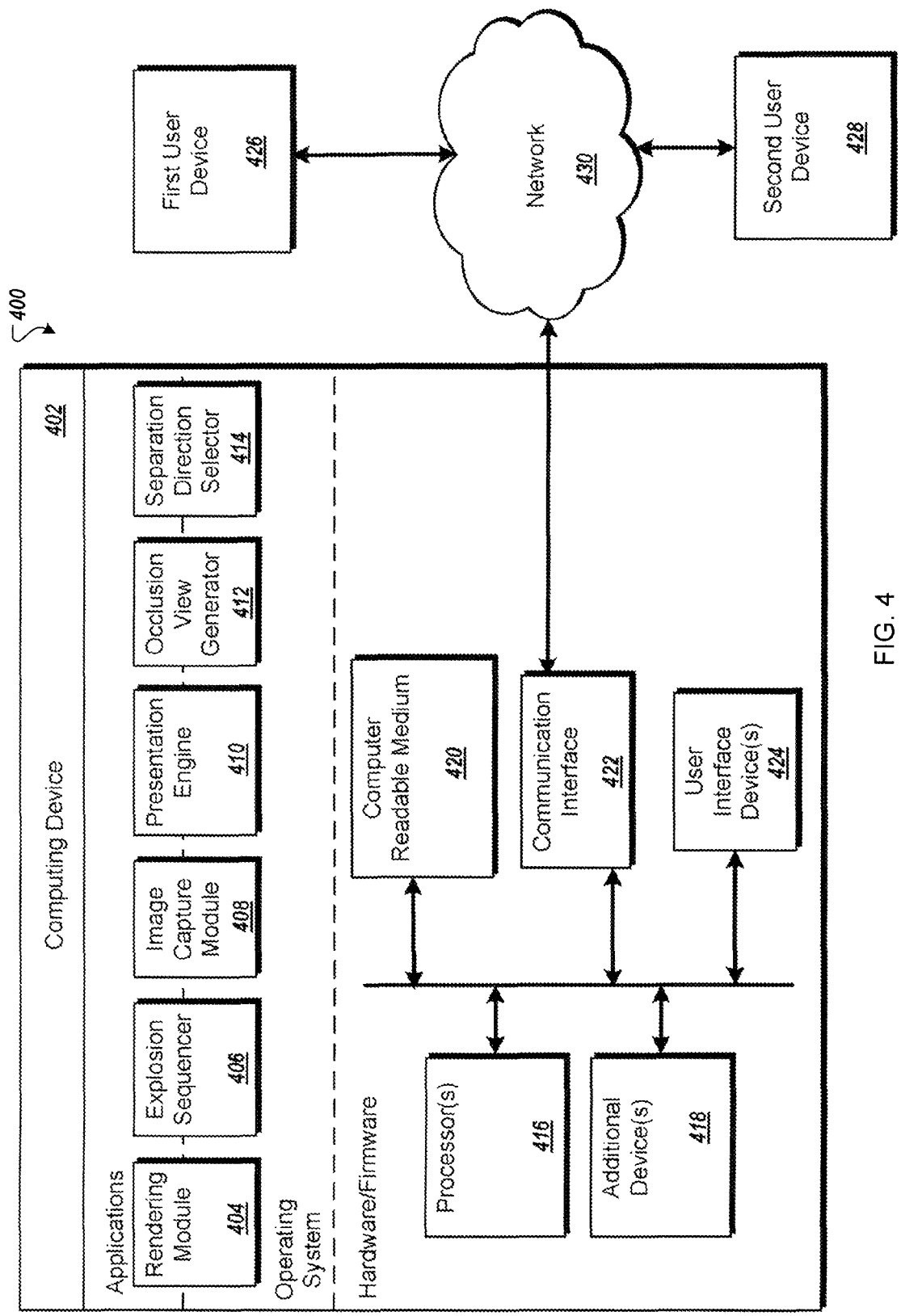
FIG. 4 shows an example architecture of a system.

Referring now to FIG. 4, a system 400 includes a computing device 402, The computing device 402 is a data processing apparatus, for example, a desktop computer, a mobile computing device, or a server. While only one data processing apparatus is shown in FIG. 4, a plurality of data processing apparatus may be used. In various implementations, the computing device 402 includes various modules, e.g. executable software programs. In various implementations, these modules include a rendering module 404, an explosion sequencer 406, a image capture module 408, presentation engine 410, an occlusion view generator 412, and a separation direction selector 414.

The rendering module 404 generates a three-dimensional rendering of an assembly. In some implementations, generating the three-dimensional rendering includes generating three-dimensional renderings of various components of the assembly and positioning the components in relation to each other to create a three-dimensional rendering of the assembly in an assembled state. For example, the rendering module 404 can create the three-dimensional rendering 100 shown in FIG. 1A. As another example, the rendering module 404 can generate the three-dimensional rendering 200 shown in FIG. 2A.

The explosion sequencer 406 creates an explosion sequence for an assembly. For example, an explosion sequence can be created for the assembly represented by the three-dimensional rendering generated by the rendering module 404. The explosion sequencer 406 can determine a separation order for separating the various components of the assembly as described above with reference to FIGS. 2A-2G. For example, the occlusion view generator 412 can generate a plurality of occlusion views of the assembly. The occlusion views can be analyzed by the explosion sequencer 406 to determine an order for separating the various components of the assembly. In some implementations, this analysis includes assigning occlusion rankings to the occlusion views and comparing the occlusion rankings of the plurality of occlusion views.

The separation direction selector determines separation directions for separating components of an assembly. For example, the separation direction selector can analyze occlusion views for the assembly generated by the occlusion view generator and assign occlusion rankings to the occlusion views. The separation direction selector 414 can then compare the occlusion rankings of the occlusion views to determine an occlusion view with a best occlusion ranking. In some instances, more than one occlusion view can be associated with a best occlusion ranking (e.g. multiple occlusion views with an occlusion percentage of 0%) In such instances, a viewing angle of an occlusion view that is closest to a separation direction of a previously separated part from among the occlusion views can be selected as the separation direction for separating a component associated with the occlusion view. In some instances in which more than one occlusion view is associated with a best occlusion ranking, one of the more than one occlusion views is selected randomly and the viewing angle of the randomly selected occlusion view is identified as the separation direction. In some implementations, the separation direction selector 414 can provide indications of separation directions to the explosion sequencer 406. The explosion sequencer 406 can use the indicated separation directions to create an explosion sequence of the assembly.

The image capture module 408 creates images of explosion sequences. For example, the explosion sequencer 406 generates an explosion sequence for an assembly. The image capture module 408 can capture and store images of one or more stages of the explosion sequence.

The presentation engine 410 creates a presentation using the images created by the image capture module. For example, the presentation engine 410 can place the images in an order to create an assembly presentation that shows an assembly sequence for an assembly. In some implementations, the presentation engine 410 can be used to change the order of images in an assembly presentation, delete images from an assembly presentation, or add images to an assembly presentation. In some implementations, the presentation engine 410 adds animation to an assembly presentation to show components of an assembly moving between various stages of an assembly or disassembly sequence as described above.

The computing device 402 also has hardware or firmware devices including one or more processors 416, one or more additional devices 418, computer readable medium 420, and one or more user interface devices 424. User interface devices 424 include, for example, a display, a speaker, a keyboard, and a mouse or touch screen. The one or more processors 416 can be used to execute program code and perform the functionality of the above describe executable software programs. The computer readable medium 420 can store executable software programs. In some implementations, the computer readable medium is used to store renderings generated by the rendering module 404, explosion sequences generated by the explosion sequencer 406, occlusion views generated by the occlusion view generator, images captured by the image capture module 408, or presentations created by the presentation engine 410.

In some implementations, the communication interface 422 is used to communicate with one or more user devices, such as first and second user devices 426 and 428, through a network 430 (e.g. the internet). For example, the first and second user devices 426 and 428 can be desktop computers and the computing device 402 is a server. The first user device 426 can receive explosion sequences generated by the explosion sequencer 406, images generated by the image capture module 408, or assembly presentations crated by the presentation engine 410 from the computing device 402 via the network 430. As another example, the second user device 428 can receive an assembly presentation from the computing device 402 over the network 430 and display the assembly presentation to a user using a monitor.

Figure 5:
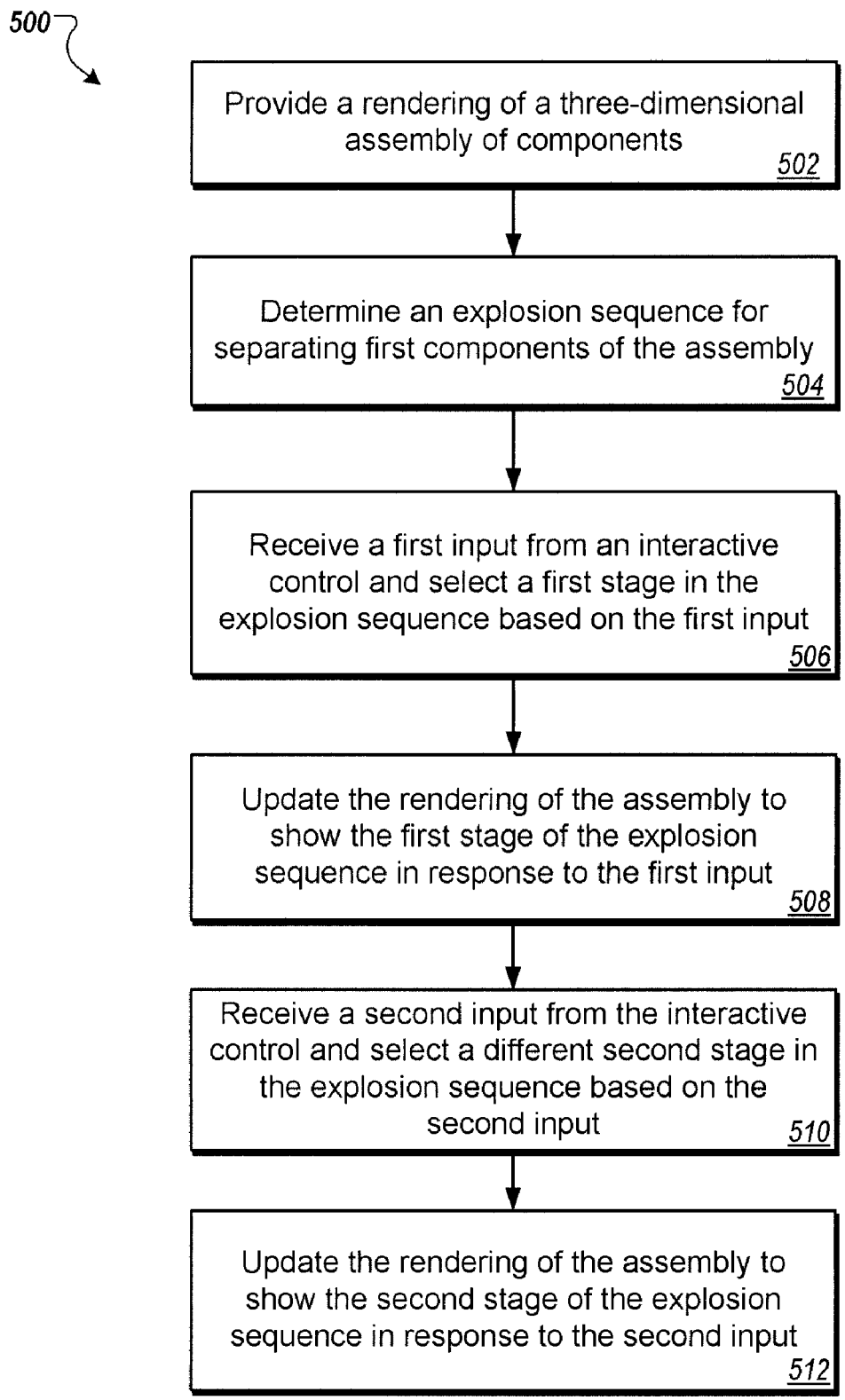
FIG. 5 shows a flowchart of an example method for presenting stages in an explosion sequence.

Referring now to FIG. 5, a method 500 for presenting stages in an explosion sequence includes a step 502 of providing a rendering of a three-dimensional assembly of components. For example, the three-dimensional rendering 100 shown in FIG. 1A is generated using CAD software and displayed on a monitor. As another example, a previously generated rendering of a three-dimensional assembly is provided to a computer, such as the computing device 402 shown in FIG. 4.

At step 504, an explosion sequence for separating first components of the assembly is determined. For example, referring to FIG. 4, the explosion sequencer 406 determines a sequence for separating two or more components of an assembly. As another example, referring to FIGS. 2A-2G, an explosion sequence for separating the components of the assembly 202 in order to create the fully disassembled view shown in FIG. 2H is determined. More specifically, it can be determined that the first step in the explosion sequence includes separating the component 204 from the sub-assembly 206. It can further be determined that the second step in the explosion sequence includes separating the component 210 from the sub-assembly 212. In some implementations, determining an explosion sequence for separating first components of the assembly includes identifying and analyzing occlusion views of the assembly.

At step 506, a first input from an interactive control is received and a first stage in the explosion sequence is selected based on the first input. For example, referring to FIGS. 2A-2G, an input is received from the first interactive control 250 indicating that the third step of the explosion sequence is to be selected. The third stage of the explosion sequence, as shown in FIG. 2C, can then be selected. As another example, the first step in the explosion sequence is displayed as shown in FIG. 2A. A user selects the button 254 using the cursor 280 to advance the explosion sequence to the second step. The second step of the explosion sequence, as shown in FIG. 2B, is selected in response to the user input received from the first interactive control 250. As yet another example, a user can use the slider control 256 of the first interactive control 250 to move between stages of the explosion sequence and indicate a stage that is to be selected. As yet another example, the text field 258 can receive a user input of "10." The tenth step of the explosion sequence, as shown in FIG. 2E, can be selected in response to the user input.

At step 508, the rendering of the assembly is updated to show the first stage of the explosion sequence in response to the first input. For example, referring again to FIGS. 2A-2G, the three-dimensional rendering 200 can be displayed as shown in FIG. 2B. A user can select the button 254 to advance the explosion sequence. The three-dimensional rendering 200 can be updated to display the third step of the explosion sequence as shown in FIG. 2C. As another example, input indicating that the eleventh step of the explosion sequence can be received from the first interactive control 250. The three-dimensional rendering 200 is then updated to show the eleventh step of the explosion sequence as shown in FIG. 2F.

At step 510, a second input from the interactive control is received and a different second stage in the explosion sequence is selected based on the second input. For example, referring again to FIGS. 2A-2G, after selecting the button 254 to advance the explosion sequence from the first step to the second step, a user can select the button 254 again to advance the explosion sequence from the second step to the third step. The third step of the explosion sequence is selected in response to this input. As another example, the slider control 256 can be used to indicate a second stage of the explosion sequence. The first interactive control 250 provides this indication as a second input. The indicated second stage is then selected in response to the second input.

At step 512, the rendering of the assembly is updated to show the second stage of the explosion sequence in response to the second input. For example, referring to FIG. 2D, the second input indicates that the eighth stage in the explosion sequence. The three-dimensional rendering 200 is updated to show the eighth stage of the explosion sequence as shown in FIG. 2D.

Figure 6:
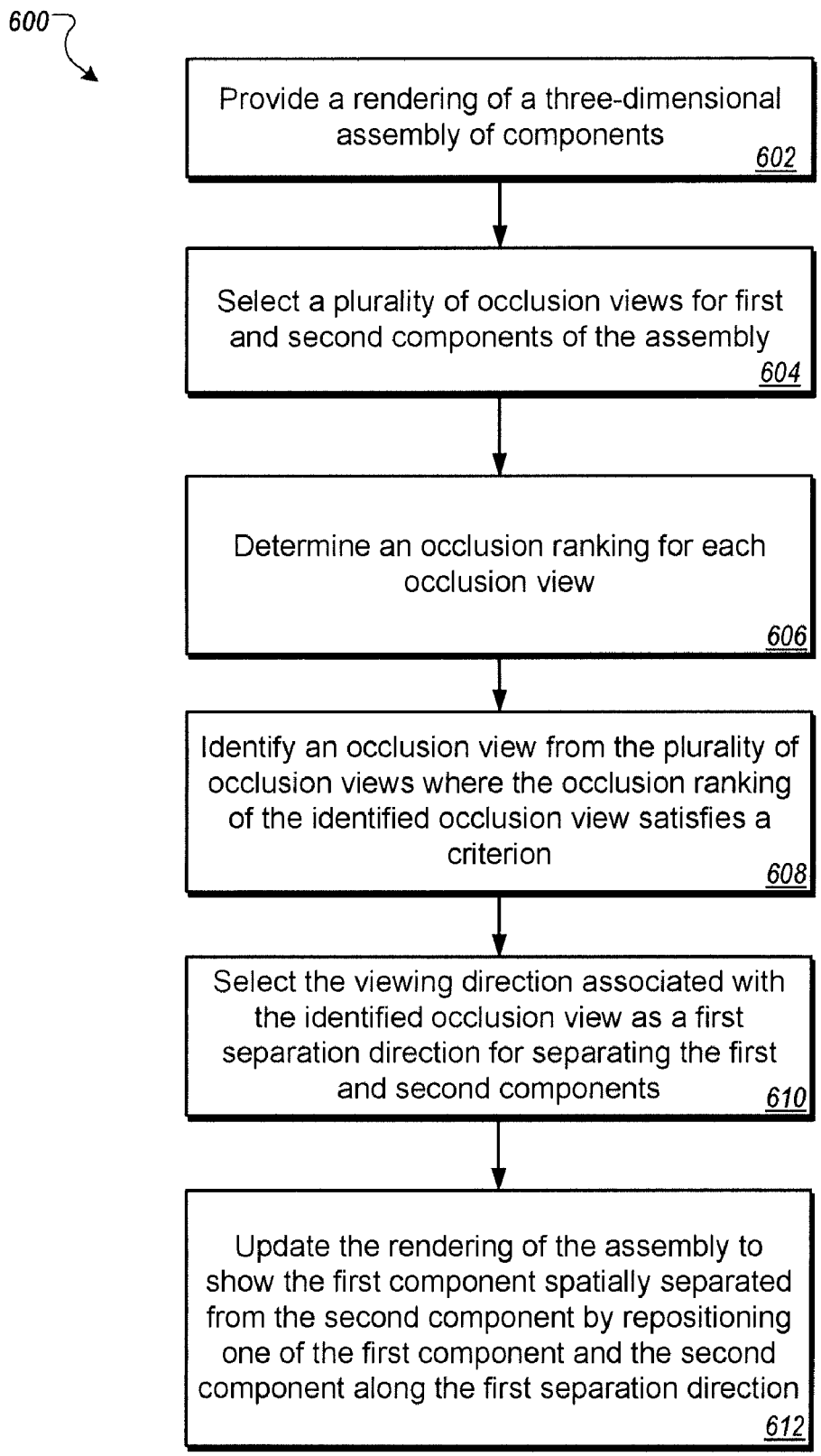
FIG. 6 shows a flowchart of an example method for separating two components of an assembly in a three-dimensional rendering.

Referring now to FIG. 6, a method for separating two components of an assembly in a three-dimensional rendering includes a step 602 of providing a rendering of a three-dimensional assembly of components. For example, the three-dimensional rendering 200 shown in FIG. 2A is generated using CAD software and displayed on a computer screen. As another example, a previously generated rendering of a three-dimensional assembly is provided to a computer, such as the first user device 426 shown in FIG. 4.

At step 604, a plurality of occlusion views for first and second components of the assembly are selected. In some implementations, each occlusion view represents the first and second component in a different viewing direction and identifies where the first component is blocked by the second component for the associated viewing direction. For example, referring to FIG. 4, the occlusion view generator 412 can generate a plurality of occlusion views of an assembly from a plurality of different viewing angles. In some implementations, a computer readable medium can store previously generated occlusion views of an assembly. A plurality of the previously generated occlusion views that are associated with the first and second components can be selected. As another example, referring to FIGS. 1A-1H, the occlusion views 110, 120, 130, 140, 150, 160, and 170 are selected. As another example, only the occlusion views 130, 150, and 170 are selected since each of the occlusion views 130, 150, and 170 indicate areas where the component 106 is physically blocked by the component 104.

At step 606, an occlusion ranking for each occlusion view is determined. For example, an occlusion percentage can be assigned to each occlusion view. The occlusion percentage can represent a percentage of a first component that is physically blocked by one or more other components for a given occlusion view. As another example, referring to FIGS. 1A-1H, the occlusion view 130 is assigned an occlusion ranking of poor, the occlusion view 150 is assigned an occlusion ranking of bad, and the occlusion view 170 is assigned an occlusion ranking of best. The occlusion view 170 is assigned an occlusion ranking of best since the occlusion view 170 indicates that the component 106 is not physically blocked by the component 104 for the occlusion view 170.

At step 608, an occlusion view is identified from the plurality of occlusion views where the occlusion ranking of the identified occlusion view satisfies a criterion. For example, the identified occlusion view may have a best occlusion ranking. As another example, the identified occlusion view may have a lowest occlusion percentage. As yet another example, the identified occlusion view may have an occlusion percentage that is equal to or below a predetermined threshold. As yet another example, the occlusion ranking of the identified occlusion view can be the same as an occlusion ranking for one or more other occlusion views, where the shared occlusion ranking is better than occlusion rankings for all remaining occlusion views of the plurality of occlusion views.

At step 610, a viewing direction associated with the identified occlusion view is selected as a first separation direction for separating the first and second components. For example, referring to FIG. 1H, the occlusion view 170 is associated with an occlusion ranking that satisfies a criterion as described above for step 608. The viewing direction of the occlusion view 170 is selected as a separation direction for separating the component 106 from the component 104. In some implementations, the separation direction is selected as being towards the point of view for the occlusion view 170.

At step 612, the rendering of the assembly is updated to show the first component spatially separated from the second component by repositioning one of the first component and the second component along the first separation direction. For example, referring to FIGS. 1A-1H, the component 106 is separated from the component 104 by moving the component 106 along the separation direction. In some implementations, moving the component 106 along the separation direction includes moving the component 106 towards the point of view of the occlusion view 170 while the component 104 maintains a stationary position within the three-dimensional rendering. In some implementations, the component 106 is moved until a distance between the component 106 and the component 104 is equal to a specified distance gap. In some implementations, the distance between the component 106 and the component 104 is determined by projecting the components 104 and 106 onto a line, as described above with reference to FIG. 3. As another example, referring to FIGS. 2A-2G, a separation direction for separating the component 204 from the sub-assembly 206 is identified. The three-dimensional rendering 200 is then updated to show the component 204 repositioned along an identified separation direction with respect to the sub-assembly 206 so that the component 204 is spatially separated from the sub-assembly 206.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
providing a rendering of a three-dimensional assembly of components;
determining an explosion sequence for separating first components of the assembly wherein the explosion sequence comprises stages in which each stage represents a different spatial relationship between two or more of the first components;
receiving a first input from an interactive control and selecting a first stage in the explosion sequence based on the first input;
responsive to the first input, updating the rendering of the assembly to show the first stage of the explosion sequence;
receiving a second input from the interactive control and selecting a different second stage in the explosion sequence based on the second input;
responsive to the second input, updating the rendering of the assembly to show the second stage of the explosion sequence;
receiving input indicating that images of a plurality of stages of the explosion sequence are to be saved;
saving images of the indicated plurality of stages; and
creating a presentation which includes images of the indicated plurality of stages.

2. The method of claim 1 in which the stages, when rendered in order, represent a disassembly sequence of the assembly.

3. The method of claim 1 in which the control is a slider control.

4. The method of claim 1 in which the presentation is an assembly presentation, wherein the assembly presentation represents a series of steps to be performed when assembling the assembly.

5. The method of claim 1 in which the presentation is a disassembly presentation, wherein the disassembly presentation represents a series of steps to be performed when disassembling the assembly.

6. The method of claim 1 in which the presentation includes an animation that shows at least one component moving between a position depicted in the first stage and a position depicted in the second stage.

7. The method of claim 1, further comprising:
receiving a third input from a component distance control; and
adjusting a distance between two components in the first or second stage based on the third input.

8. A computer-implemented method comprising:
providing a rendering of a three-dimensional assembly of components;
determining a first separation direction for separating a first component from a second component, wherein determining the first separation direction comprises:
selecting a plurality of occlusion views for the first and second component, wherein each occlusion view represents the first and second component in a different viewing direction and identifies where the first component is blocked by the second component for the viewing direction;
determining an occlusion ranking for each occlusion view wherein the occlusion ranking is based on an occlusion percentage of the occlusion view, wherein the occlusion percentage is the percentage of the first component that is blocked by the second component for a given occlusion view;
identifying an occlusion view from the plurality of occlusion views wherein the occlusion ranking of the identified occlusion view satisfies a criterion, wherein the identified occlusion view satisfies the criterion by having a lowest occlusion percentage from among the plurality of occlusion views; and
selecting the viewing direction associated with the identified occlusion view as the first separation direction; and
updating the rendering of the assembly to show the first component spatially separated from the second component by repositioning one of the first component and the second component along the first separation direction.

9. The method of claim 8 in which the first component represents a substantially linear component and the identified occlusion view satisfies the criterion by having a viewing direction that is the same as a major axis of the first component.

10. The method of claim 8, further comprising:
determining a second separation direction for separating a third component from the second component;
updating the rendering of the assembly to show the second component spatially separated from the third component by repositioning one of the second component and the third component along the second separation direction;
positioning the third component in an original position associated with the third component in the rendering while keeping the second component positioned about an axis defined by the second separation direction with respect to the third component and keeping the first component positioned about an axis defined by the first separation direction with respect to the second component; and moving the second component towards an original position associated with the second component in the rendering until the second component reaches a specified distance gap from the third component while keeping the first component positioned about an axis defined by the first separation direction with respect to the second component.

11. The method of claim 10 in which the distance between the second component and the third component is determined by projecting the second and third components onto a line and measuring the distance on the line between the projections of the second and third components.

12. The method of claim 11 in which the line is parallel to the axis defined by the second separation direction.

13. The method of claim 10 in which updating the rendering of the assembly to show the second component spatially separated from the third component comprises moving one of the second and third components a distance greater than the specified distance gap.

14. The method of claim 10, further comprising:
receiving an input from a component distance control;
assigning a new value to the specified distance gap based on the input; and
positioning the second component along the axis defined by the second separation direction a distance equivalent to the new specified distance gap from the third component while keeping the first component positioned about an axis defined by the first separation direction with respect to the second component.

15. The method of claim 10, further comprising moving the first component towards an original position associated with the first component in the three-dimensional rendering until the first component reaches a specified distance gap from the second component.

16. The method of claim 10 in which the first separation direction is different from the second separation direction.

17. The method of claim 16 in which the first separation direction is less than 90 degrees from the second separation direction.

18. A system comprising:
one or more computers programmed to perform operations comprising:
providing a rendering of a three-dimensional assembly of components;
determining a first separation direction for separating a first component from a second component, wherein determining the first separation direction comprises:
selecting a plurality of occlusion views for the first and second component, wherein each occlusion view represents the first and second component in a different viewing direction and identifies where the first component is blocked by the second component for the viewing direction;
determining an occlusion ranking for each occlusion view wherein the occlusion ranking is based on an occlusion percentage of the occlusion view, wherein the occlusion percentage is the percentage of the first component that is blocked by the second component for a given occlusion view;
identifying an occlusion view from the plurality of occlusion views wherein the occlusion ranking of the identified occlusion view satisfies a criterion, wherein the identified occlusion view satisfies the criterion by having a lowest occlusion percentage from among the plurality of occlusion views; and
selecting the viewing direction associated with the identified occlusion view as the first separation direction; and
updating the rendering of the assembly to show the first component spatially separated from the second component by repositioning one of the first component and the second component along the first separation direction.

19. The system of claim 18 in which the first component represents a substantially linear component and the identified occlusion view satisfies the criterion by having a viewing direction that is the same as a major axis of the first component.

20. The system of claim 18, wherein the operations further comprise:
determining a second separation direction for separating a third component from the second component;
updating the rendering of the assembly to show the second component spatially separated from the third component by repositioning one of the second component and the third component along the second separation direction;
positioning the third component in an New position associated with the third component in the rendering while keeping the second component positioned about an axis defined by the second separation direction with respect to the third component and keeping the first component positioned about an axis defined by the first separation direction with respect to the second component; and
moving the second component towards an New position associated with the second component in the rendering until the second component reaches a specified distance gap from the third component while keeping the first component positioned about an axis defined by the first separation direction with respect to the second component.

21. The system of claim 20 in which the distance between the second component and the third component is determined by projecting the second and third components onto a line and measuring the distance on the line between the projections of the second and third components.

22. The system of claim 21 in which the line is parallel to the axis defined by the second separation direction.

23. The system of claim 20 in which updating the rendering of the assembly to show the second component spatially separated from the third component comprises moving one of the second and third components a distance greater than the specified distance gap.

24. The system of claim 20, wherein the operations further comprise:
receiving an input from a component distance control;
assigning a new value to the specified distance gap based on the input; and
positioning the second component along the axis defined by the second separation direction a distance equivalent to the new specified distance gap from the third component while keeping the first component positioned about an axis defined by the first separation direction with respect to the second component.

25. The system of claim 20, wherein the operations further comprise moving the first component towards an New position associated with the first component in the three-dimensional rendering until the first component reaches a specified distance gap from the second component.

26. The system of claim 20 in which the first separation direction is different from the second separation direction.

27. The system of claim 26 in which the first separation direction is less than 90 degrees from the second separation direction.

28. A system comprising:
one or more computers programmed to perform operations comprising:
providing a rendering of a three-dimensional assembly of components;
determining an explosion sequence for separating first components of the assembly wherein the explosion sequence comprises stages in which each stage represents a different spatial relationship between two or more of the first components;
receiving a first input from an interactive control and selecting a first stage in the explosion sequence based on the first input;
responsive to the first input, updating the rendering of the assembly to show the first stage of the explosion sequence;
receiving a second input from the interactive control and selecting a different second stage in the explosion sequence based on the second input;
responsive to the second input, updating the rendering of the assembly to show the second stage of the explosion sequence;
receiving input indicating that images of a plurality of stages of the explosion sequence are to be saved;
saving images of the indicated plurality of stages; and
creating a presentation which includes images of the indicated plurality of stages.

29. The system of claim 28 in which the stages, when rendered in order, represent a disassembly sequence of the assembly.

30. The system of claim 28 in which the control is a slider control.

31. The system of claim 28 in which the presentation is an assembly presentation, wherein the assembly presentation represents a series of steps to be performed when assembling the assembly.

32. The system of claim 28 in which the presentation is a disassembly presentation, wherein the disassembly presentation represents a series of steps to be performed when disassembling the assembly.

33. The system of claim 28 in which the presentation includes an animation that shows at least one component moving between a position depicted in the first stage and a position depicted in the second stage.

34. The system of claim 28, wherein the operations further comprise:
receiving a third input from a component distance control; and
adjusting a distance between two components in the first or second stage based on the third input.

* * * * *